United States Patent [19]
Etoh

[11] Patent Number: 6,081,551
[45] Date of Patent: *Jun. 27, 2000

[54] IMAGE CODING AND DECODING APPARATUS AND METHODS THEREOF

[75] Inventor: Minoru Etoh, Katano, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/731,947

[22] Filed: Oct. 23, 1996

[30] Foreign Application Priority Data

Oct. 25, 1995 [JP] Japan ................................ 7-277993

[51] Int. Cl.⁷ ........................................................ H04N 7/12
[52] U.S. Cl. ............................ 375/240; 348/415; 348/402
[58] Field of Search .................................... 348/402, 409, 348/411, 412, 413, 415, 146, 1, 416

[56] References Cited

U.S. PATENT DOCUMENTS

| | | | |
|---|---|---|---|
| 5,319,453 | 6/1994 | Copriviza et al. | 348/1 |
| 5,355,378 | 10/1994 | Ohta | 348/413 |
| 5,386,234 | 1/1995 | Veltman et al. | 348/413 |
| 5,418,570 | 5/1995 | Ueno et al. | 348/413 |
| 5,488,482 | 1/1996 | Ueda et al. | 348/402 |
| 5,608,458 | 3/1997 | Chen et al. | 348/413 |
| 5,630,033 | 5/1997 | Purcell et al. | 348/416 |
| 5,703,646 | 12/1997 | Oda | 348/402 |
| 5,721,588 | 2/1998 | Fujiwara et al. | 438/402 |
| 5,786,859 | 7/1998 | Ueno et al. | 348/416 |
| 5,821,986 | 10/1998 | Yuan et al. | 348/402 |

OTHER PUBLICATIONS

ITU–T (Telecommunication Standardization Sector of ITU), Draft H.263, "Line Transmission Of Non–Telephone Signals/Video Coding For Low Bitrate Communication", Recommendation H.263, (Dec. 5, 1995).

*Primary Examiner*—Andy Rao
*Assistant Examiner*—Gims Philippe
*Attorney, Agent, or Firm*—Ratner & Prestia

[57] ABSTRACT

To achieve an image encoding apparatus that has extensibility by not limiting an image to be referenced, and that can reduce processing time satisfactorily if the processing of an ordinary frame is skipped, the apparatus of the present invention comprises: motion detecting means for detecting a motion vector for each block of a prescribed size from a reference image and an input image; weighted motion-compensation means for, based on the detected motion vector, extracting from the reference image an area of a prescribed size which is wider than the prescribed block size and which contains an area corresponding to each block of the input image, and for creating a predicted image for the input image by applying a predetermined weight to each of pixels in the wider area and by using the weighted pixels of the wider area; a predicted-image memory for storing the predicted image; encoding means for taking a residual between the stored predicted image and the input image, and for encoding the residual; and decoding means for decoding the encoded image data and thereby obtaining a reference image.

4 Claims, 21 Drawing Sheets

WEIGHTING FACTORS FOR OVERLAPPED PIXELS FOR COLOR-DIFFERENCE SIGNALS, NORMALIZED BY MULTIPLYING BY 1/8

```
0 0 0 0 0                                                     1 1 1 1                                               0 0 0 0 0
0 0 0 0 0                                                     1 1 1 1 1                                             0 0 0 0 0
0 0 0 0 0   1 1 1 1                             2 1 1 1 1                           1 1 1 1 1                       0 0 0 0 0
0 0 0 0 0   1 1 1 1 1     2 2 1 1 1             3 2 1 1 1                           2 1 1 1 1                       0 0 0 0 0
1 1 2 2     1 1 1 1 2     4 4 4 4 4             5 4 4 4 4 4           3 3 2 2 2     3 2 1 1 1                       1 1 1 1
1 1 2 2 2   1 1 1 2 2     4 4 5 4 4             6 5 5 5 5 4 4         4 3 3 2 2 2   3 2 2 1 1                       1 1 1 1 1
1 1 2 2 3   1 1 2 2 3     4 5 5 5 5 4           7 6 6 6 6 6 6 5       5 4 4 4 3 2   4 3 2 2 2 1                     1 1 1 1 1
1 1 2 2 3 3 1 2 2 3 3     4 5 5 5 6 5 5         7 7 7 7 7 7 7 6       6 5 5 4 4 3   4 3 2 2 2 1 1                   1 1 1 1 1
1 1 2 2 3 4 1 2 3 4 4 4   4 5 5 5 6 7 7 7       8 8 8 8 8 8 8 8       7 6 6 5 5 4 4 4 4 3 3 3 2 2                   1 1 1 1 1 1
1 1 2 3 3 4 1 2 3 3 4 4 4 4 5 5 5 7 7 7 7       8 8 8 8 8 8 8 8       7 7 6 6 5 5 4 4 4 4 3 3 3 2 2 1               1 1 1 1 1 1
1 1 2 3 3 4 1 2 2 3 4 4 4 4 5 5 5 7 7 7 7       8 8 8 8 8 8 8 8       7 7 7 6 5 5 4 4 4 3 3 3 3 2 1                 1 1 1 1 1 1
1 1 2 3 3 4 1 2 3 3 4 4 4 4 5 5 5 7 7 7 7       8 8 8 8 8 8 8 8       7 7 7 6 6 5 4 4 4 3 3 3 3 2 1                 1 1 1 1 1 1
1 1 2 3 3 4 1 2 3 3 4 4 4 4 5 5 5 7 7 7 7       8 8 8 8 8 8 8 8       7 7 7 6 5 5 4 4 4 4 3 3 3 2 1                 1 1 1 1 1 1
1 1 2 3 3 4 1 2 3 3 4 4 4 4 5 5 6 7 7 7 7       8 8 8 8 8 8 8 8       7 7 7 6 6 5 4 4 4 3 3 2 2 1                   1 1 1 1 1 1
1 1 2 2 3   1 2 3 3 4 4   4 5 5 6 6             7 7 6 7 7 7 7 7       7 6 6 5 5 4 4 4 3 3 2 1 1                     1 1 1 1 1 1
1 1 2 2 3   1 1 2 2 3     4 4 5 5 6             5 6 6 6 5 6 6 7       5 6 6 5 4 4   3 2 2 2 1 1 1                   1 1 1 1 1 1
1 1 2 2 3   1 1 2 2 3     4 4 5 5 6             5 5 5 5 4 5 5         4 5 5 4 4 4   2 2 2 1 1 1                     1 1 1 1 1
1 1 2 2     1 1 2 2 3     4 4 4 5 5             4 5 6 5 5 4           4 5 4 4 4     2 2 1 1 1 1                     1 1 1 1 1
0 0 0 0 0   1 2 2 2 3     3 4 4 4 4             4 5 5 5 5 4           4 4 4 4 4     1 2 2 2 2                       0 0 0 0 0
0 0 0 0 0   1 2 2 2 3     3 4 4 4 4             4 4 4 4 4 4           4 4 4 4 4     1 2 2 2 2                       0 0 0 0 0
0 0 0 0 0   1 1 2 2 3     2 2 3 3 3             3 3 3 3 3 3           3 3 3 3 3     1 1 1 1 1                       0 0 0 0 0
0 0 0 0 0   1 1 1 1 2     2 2 3 3 3             3 3 3 3 3 3           3 3 3 3 3     1 1 1 1 1                       0 0 0 0 0
            1 1 1 1 1                                                                                               0 0 0 0 0
            1 1 1 1                                                                                                 0 0 0 0 0
```

WEIGHTING FACTORS FOR OVERLAPPED PIXELS FOR LUMINANCE SIGNAL, NORMALIZED BY MULTIPLYING BY 1/8

PRIOR ART   H.263 ENCODER

PRIOR ART          H.263 DECODER

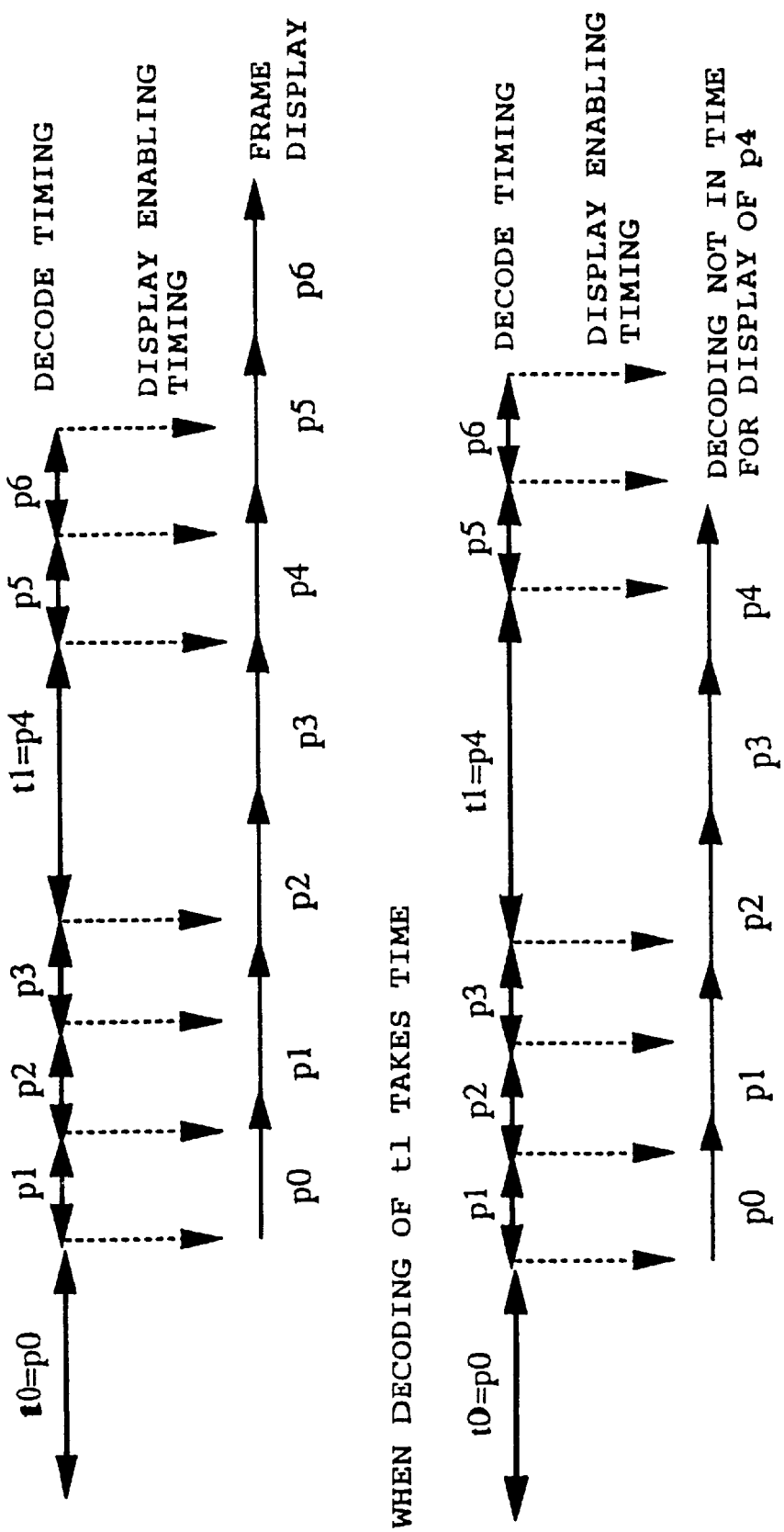

IMAGE CODING AND DECODING APPARATUS AND METHODS THEREOF

BACKGROUND OF THE INVENTION

1. Field of the Invention

The present invention relates to an image encoding apparatus, an image decoding apparatus, etc. that are used to encode and decode moving image data, for example, in videophones and the like.

2. Related Art of the Invention

In recent years, to transmit or record moving image data at low bit rates in videophone and videoconferencing systems, image compression techniques have been required to provide higher compression ratios for higher efficiency. These techniques have been standardized, for example, as MPEG 1/2 by ISO/IEC and H.261 and H.263 by ITU-T.

FIG. 17 is a block diagram of a prior art image encoding apparatus, and FIG. 18 is an image decoding apparatus corresponding to the encoding apparatus, both implementing the ITU-T standard H.263.

Referring to FIG. 17, when intraframe-coding an input image, an intraframe/interframe coding selection switch 11 is switched to the upper position. The input image, after discrete-cosine-transformed by a DCT 5, is quantized by a quantizer 6 and variable-length encoded by a Huffman encoder 12, and then multiplexed by a MUX (multiplexer) 14 and output as a bit stream. In this process, part of the signal quantized by the quantizer 6 is inverse-quantized by an inverse quantizer 7 and inverse-discrete-cosine-transformed by an inverse DCT 8, and then stored as a reference image in a frame delay memory 3 via an adder 9. The illustrated example shows an advanced motion compensation mode, that is, the encode unit is an 8×8 block.

On the other hand, when interframe-coding an input image, the intraframe/interframe coding selection switch 11 is switched to the lower position. The input image is compared, in a motion estimator 1, with the reference image stored in the frame delay memory 3, and a motion vector is detected for each block and is stored in a motion vector memory 2. Based on the motion vector, a motion compensator 4 searches the reference image for each block for a region corresponding to the block and thereby creates a predicted image from the reference image. That is, motion compensation is performed relative to the reference image. The residual between the thus created predicted image and the input image is obtained using a subtractor 10. The resulting residual signal is encoded through the DCT 5 and quantizer 6 and variable-length encoded by the Huffman encoder 12, and then multiplexed by the MUX 14 and output as a bit stream. In this process, the quantized signal is inverse-quantized by the inverse quantizer 7 and inverse-discrete-cosine-transformed by the inverse DCT 8, and then added in the adder 9 to the predicted image output from the motion compensator 4, and stored in the frame delay memory 3 as a reference image. The motion vectors obtained by the motion estimator 1 are encoded by a motion vector encoder 13, and output after being multiplexed by the MUX 14 with the residual signal output from the Huffman encoder 12.

Referring next to FIG. 18, when the encoded bit stream output from the above image encoding apparatus is input to the image decoding apparatus, the bit stream is demultiplexed by a DMUX (demultiplexer) 15 into the encoded image signal and encoded motion vector signal. The image signal is decoded by a Huffman decoder 16, and further decoded by an inverse quantizer 7 and inverse DCT 8. At this time, if the image signal is an intraframe-encoded signal, an intraframe/interframe coding selection switch 18 is connected to the upper position so that the image signal is output directly as an output image. The output image is also stored in a frame delay memory 3 as a reference image.

On the other hand, the motion vectors demultiplexed by the DMUX 15 are decoded by a motion vector decoder 17 and stored in a motion vector memory 2. Based on these motion vectors, a motion compensator 4 creates a predicted image from the reference image fed from the frame delay memory 3, and the thus created predicted image is added in an adder 9 to the image signal output from the inverse DCT 8. At this time, if the image signal is an interframe-encoded signal (that is, the residual signal), the intraframe/interframe coding selection switch 18 is connected to the lower position so that the sum signal is output as an output image.

Here, as shown in FIG. 19($a$), for each of the 8×8 blocks into which the input image is divided, the motion estimator 1 searches the reference image for a region having the highest correlation with the target block, and obtains a motion vector for that block by detecting its displacement. At this time, as shown in FIG. 19($b$), for example, there can arise cases where the regions in the reference image which correspond to blocks T, B, L, and R surrounding a certain block C overlap the region corresponding to the block C or are separated by a certain distance from that region. As a result, when a predicted image is constructed from these searched regions, overlapping or discontinuous portions occur in the image, resulting in a degradation in image quality. To prevent such image quality degradation, it has been practiced to correct the predicted image by using motion vectors for the blocks horizontally and vertically adjacent to each target block and thus considering pixels in the neighborhood of the target block. More specifically, to obtain a prediction value for the block C, the regions in the reference image corresponding to the block C and its horizontally and vertically adjacent blocks T, B, L, and R, as shown in FIG. 19($b$), are obtained from the motion vectors for these five blocks; then, pixels are read out from these five regions and multiplied by the coefficients shown in FIG. 20 set for each block, the results then being added together and finally divided by 8 for normalization. The same processing is repeated for each block, and the predicted image is obtained from their results. The neighbor motion vectors shown at the output of the motion vector memory 2 in FIGS. 17 and 18 indicate this processing.

With the above method, the discontinuous portions occurring in an image are alleviated, and image quality improves. In cases where prediction errors (residuals) cannot be encoded sufficiently because of a low bit rate, only motion vectors, and hence only the predicted image, are transmitted; even in that case, since the predicted image is constructed in overlapping fashion as depicted in FIG. 2D, a sharp image is obtained for areas of coherent translation and a smooth or blurred image is obtained for areas of nonuniform motion.

However, with the above prior art method, since the predicted image is constructed using the motion vectors for the blocks horizontally and vertically adjacent to each target block, prediction integrity cannot be preserved unless the same reference image is used, and also the reference image is limited to only one frame (e.g. a previous one), the prior art thus has had the problem of lacking extensibility In MPEG 1/2, for example, by using the structure of IBBBPBBPBBP, P-image data can be encoded independently without referring to B-images. This means two parallel bit streams are considered; one is of IPPP . . . while the other is of additional BBB stream. However, in MPEG 1/2, bit streams are not defined as parallel streams, but arrive sequentially; therefore, if a template (i.e. reference frame) requires a very high bit rate, there may occur a case where the I-frame cannot be decoded within a prescribed time. This is called "latency" problem.

FIG. 21 is a diagram showing decode timing in the prior art image decoding apparatus. In FIG. 21, t0 and t1 each indicate a template, and p0, p1, . . . , p6 indicate ordinary frames. In the upper part of the diagram, decoding of the templates t0 and t1 does not take much time, but is done in time for the display timing, so that the frames are displayed in sequence starting with p0. On the other hand, in the lower part of the diagram, decoding of the template t1 (p4) takes a long time and is not done in time for the display timing of p4. In this case, since the decoding of p3 and p4 cannot be skipped under any circumstances, a buffer is provided to allow a margin for frame display timing, and when the decoding of p4 delays, the decoding of p5 and p6 is skipped and the decoding process proceeds to the next template. The above problem can thus be addressed.

However, in the above method that transmits using a single bit stream, bits must be interpreted one by one until the bit stream of the next template arrives, which presents the problem that the processing time cannot be shortened satisfactorily even if the processing of an ordinary frame is skipped.

SUMMARY OF THE INVENTION

In view of the above-outlined problems with the prior art image encoding and decoding, it is an object of the present invention to provide an image encoding apparatus, an image decoding apparatus, etc. that have extensibility by not limiting the reference image to a particular frame, and that can reduce the processing time satisfactorily if the processing of an ordinary frames is skipped.

According to the invention, there is provided an image encoding apparatus comprising: motion detecting means for detecting a motion vector for each block of a prescribed size from a reference image and an input image; weighted motion-compensation means for, based on the detected motion vector, extracting from the reference image an area of a prescribed size which is wider than the prescribed block size and which contains an area corresponding to each block of the input image, and for creating a predicted image for the input image by applying a predetermined weight to each of pixels in the wider area and by using the weighted pixels of the wider area; a predicted-image memory for storing the predicted image; encoding means for taking a residual between the stored predicted image and the input image, and for encoding the residual; and decoding means for reconstructing the input image data to be reconstructed at a decoding end and thereby obtaining a reference image.

According to the invention, there is also provided an image decoding apparatus comprising: decoding means for decoding encoded data input from the image encoding apparatus; a frame memory for storing a reference image; weighted motion-compensation means for, based on the motion vector decoded by the decoding means, extracting from the reference image stored in the frame memory an area of a prescribed size which is wider than the prescribed block size and which contains an area corresponding to each block of a predicted image, and for creating a predicted image by applying a predetermined weight to each of pixels in the wider area and by using the weighted pixels of the wider area; and image creating means for creating an output image based on the predicted image and the residual signal decoded by the decoding means.

With the above configuration, the reference image is not limited to the previous frame, and different reference images can be used, for example, when creating a predicted image.

According to the invention, there is also provided an image encoding method wherein image data is divided into a representative frame representative of the image data and an ordinary frame other than the representative frame, and the representative frame and the ordinary frame are assembled as different bit streams, with frame identifying information for identifying the respective frames appended thereto, and are multiplexed together for transmission.

According to the invention, there is also provided an image decoding method wherein frame identifying information is detected from encoded data input from an image encoding apparatus, the input encoded data is separated into image data of a representative frame and an ordinary frame in accordance with the detected frame identifying information, the representative frame is given priority in decoding, and if the decoding thereof overlaps the decoding of an ordinary frame that refers to an already decoded representative frame, the decoding of the ordinary frame is abandoned.

With the above method, if the decoding of the representative frame takes a long time, the decoding of an ordinary frame can be skipped easily.

According to the invention, there is also provided an image decoding method wherein an error-correcting code is extracted from a representative frame of encoded data input from an image encoding apparatus, if a data error occurs, error correction is performed on the representative frame, an error-detecting code is extracted from an ordinary frame of the input encoded data, and if a data error occurs, the ordinary frame is discarded, and a representative frame is substituted for the discarded frame.

With the above method, in the event of a channel error, for example, a minimum required level of image quality can be maintained using a representative frame.

According to the invention, there is also provided an image encoding apparatus comprising: an offset map in which offset values for a quantization step size are set for each image, the offset values being used to change the quantization step size for each block when quantizing an image for transmission; and offset appending means for appending data of the offset map at the head of data of the image.

According to the invention, there is also provided an image decoding apparatus comprising: offset extraction means for extracting the offset map from encoded data input from the image encoding apparatus; and decoding means for changing the quantization step in each image based on the extracted offset value, and for inverse-quantizing the input encoded data with the changed quantization step size and thereby decoding the encoded data.

With the above configuration, the quantization step size for each block can be easily changed according to the offset value of the offset map.

BRIEF DESCRIPTION OF THE DRAWINGS

FIG. 5 is a diagram showing weighting factors by way of example according to the first embodiment;

FIG. 21 is a diagram for explaining decoding timing of a single bit stream in the prior art image decoding apparatus.

DESCRIPTION OF REFERENCE NUMERALS

1. MOTION ESTIMATOR, 3, 23. FRAME DELAY MEMORY, 4. MOTION COMPENSATOR, 5. DCT, 6. QUANTIZER, 7. INVERSE QUANTIZER, 8. INVERSE DCT, 21a, 21b. MOTION ESTIMATOR, 22a, 22b, 22c. WEIGHTED MOTION COMPENSATOR, 24. TEMPLATE STORING MEMORY, 26. CORRELATION COMPARATOR, 32. ERROR-DETECTION CODING PACKETIZER, 52. ERROR-CORRECTION CODING PACKETIZER, 62. ERROR-DETECTING DEPACKETIZER, 63. ERROR-CORRECTING DEPACKETIZER, 73, 82. OFFSET MAP, 74. DPCM HUFFMAN ENCODER, 81. DPCM HUFFMAN DECODER

PREFERRED EMBODIMENTS

The present invention will now be described below with reference to the drawings illustrating the embodiments thereof.

(Embodiment 1)

Figure 1:
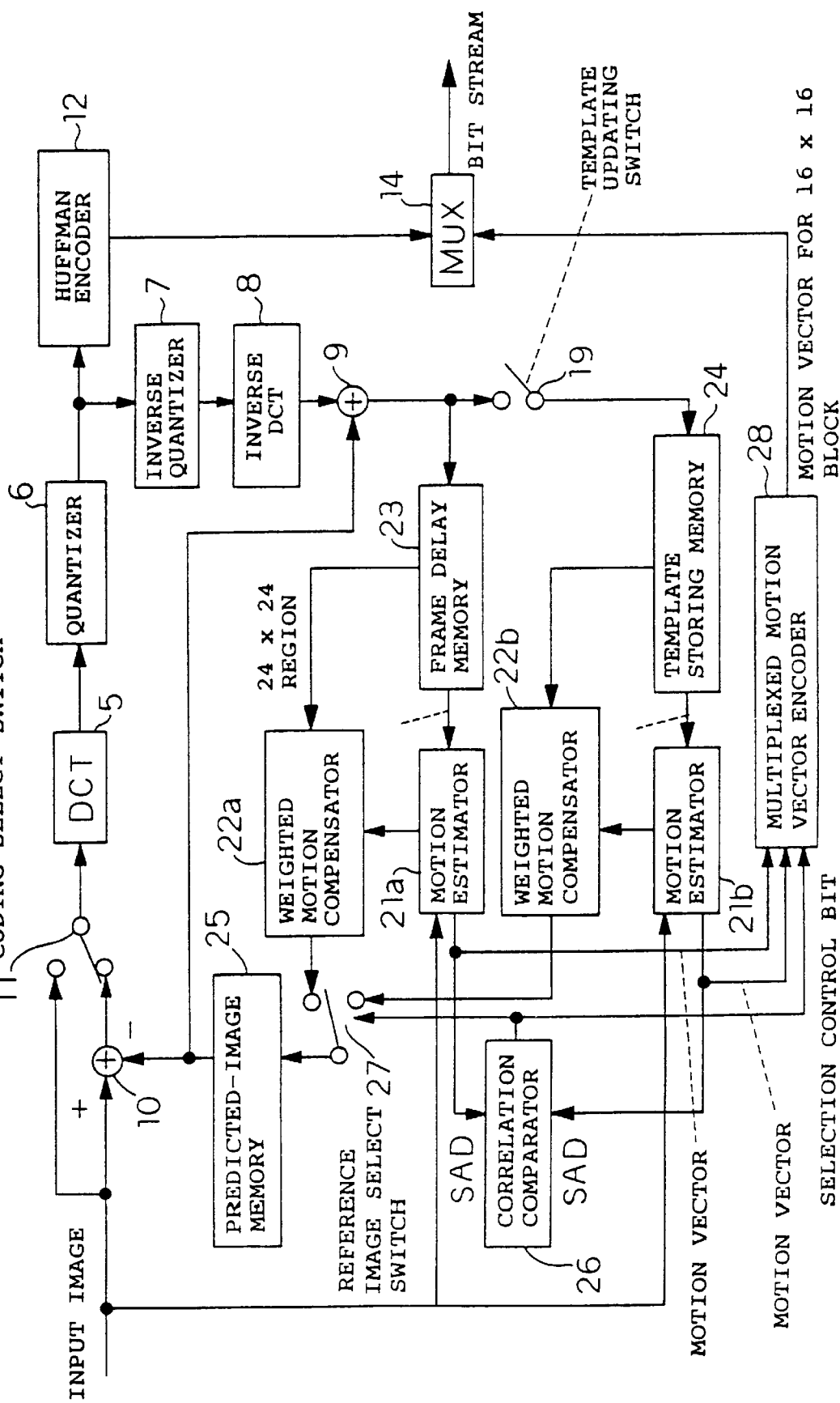
FIG. 1 is a block diagram showing the configuration of an image encoding apparatus according to a first embodiment of the present invention.
Figure 2:
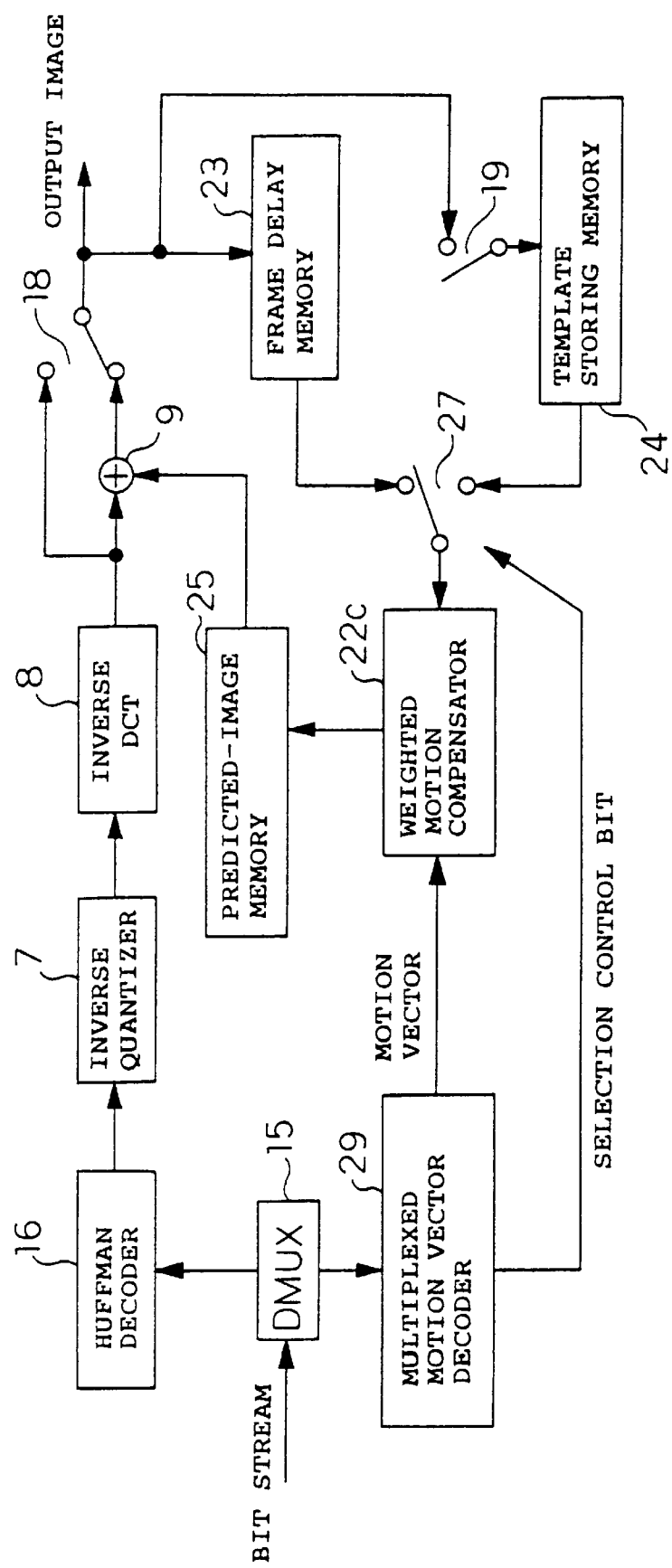
FIG. 2 is a block diagram showing the configuration of an image decoding apparatus corresponding to the image encoding apparatus of FIG. 1.

FIG. 1 is a block diagram showing the configuration of an image encoding apparatus according to a first embodiment of the present invention, and FIG. 2 is a block diagram showing the configuration of an image decoding apparatus corresponding to the image encoding apparatus. The image encoding apparatus comprises: a frame delay memory 23 for storing a reference image; a motion estimator 21a as a motion detecting means for detecting a motion vector based on the reference image and an input image; a weighted motion compensator 22a for creating a predicted image from the reference image by using the motion vector; a template storing memory 24 for storing a template (representative image) as a reference image; a motion estimator 21b as a motion detecting means for detecting a motion vector based on the input image and the template (which is a reference image different from the reference image stored in the frame delay memory 23); and a weighted motion compensator 22b for creating a predicted image from the reference image by using the motion vector.

Also included are: a correlation comparator 26 for comparing the degrees of correlation between the reference images and the input image by using the motion vectors detected by the motion estimators 21a and 21b; a reference image selection switch 27 as a selection means for selecting the weighted motion estimator associated with the reference image that has been found to have the higher correlation as the result of the comparison; a predicted-image memory 25 for storing the predicted image output via the reference image selection switch 27; and a subtractor 10 for obtaining a residual between the predicted image stored in the predicted image memory 25 and the input image.

There are also provided an intraframe/interframe coding selection switch 11 which is switched according to whether the input image is intraframe-coded or interframe-coded, a DCT 5 for discrete-cosine-transforming an image signal input via the intraframe/interframe coding selection switch 11, a quantizer 6 for quantizing the discrete-cosine-transformed signal, a Huffman encoder 12 for variable-length encoding the quantized signal, a multiplexed motion vector encoder 28 for multiplexing a selection control bit, output as selection information from the correlation comparator 26, with the motion vector selected based on the selection control bit between the motor vectors output from the motion estimators 21a and 21b, and for encoding the multiplexed data, and a MUX 14 for multiplexing the output of the multiplexed motion vector encoder 28 with the output of the Huffman encoder 12 onto a bit stream for output.

Furthermore, there are provided: an inverse quantizer 7 for inverse-quantizing the output of the quantizer 6; an inverse DCT 8 for inverse-discrete-cosine-transforming the inverse-quantized signal; an adder 9 for creating a reference image for the next input image by adding the inversediscrete-cosine-transformed signal to the predicted image stored in the predicted image memory 25; and a template updating switch 19 for updating the reference image stored in the template storing memory 24.

Here, the subtractor 10, DCT 5, quantizer 6, etc. constitute encoding means, and the inverse quantizer 7, inverse DCT 8, adder 9, etc. constitute decoding means.

On the other hand, the image decoding apparatus of FIG. 2 comprises: a DMUX 15 for taking as an input the bit stream output from the image encoding apparatus of FIG. 1, and for demultiplexing it into the image signal (usually, a residual signal) and the multiplexed motion vector; a Huffman decoder 16 for decoding the demultiplexed image signal; an inverse quantizer 7 for inverse-quantizing the decoded signal; an inverse DCT 8 for inverse-discrete-cosine-transforming the inverse-quantized signal; a multiplexed motion vector decoder 29 for decoding the multiplexed motion vector, demultiplexed by the DMUX 15, into the motion vector and selection control bit; a weighted motion compensator 22c for creating a predicted image from a reference image by using the decoded motion vector; and a predicted-image memory 25 for storing the thus created predicted image.

There are also provided: an adder 9 for creating an output image by adding the output of the inverse DCT 8 to the predicted image supplied from the predicted image memory 25; an intraframe/interframe coding selection switch 18 which is switched according to whether the input image is intraframe-coded or interframe-coded; a frame delay memory 23 for storing the output image as a reference image; a template storing memory 24 for storing as a reference image a template from the output image; a template updating switch 19 for updating the reference image stored in the template storing memory 24; and a reference image selection switch 27 for switching its input between the frame delay memory 23 and the template storing memory 24 based on the selection control bit.

Here, the Huffman decoder 16, inverse quantizer 7, inverse DCT 8, multiplexed motion vector decoder 30, etc. constitute decoding means, and the adder 9, etc. constitute image creating means. Motion vector detection is performed here in units of 16×16 blocks, that is, in units of so-called macroblocks. It will be recognized, however, that the term "block" used in the appended claims refers to a block of any prescribed size, and includes an 8×8 block as well as the above-mentioned macroblock, and even a block of other size.

The operation of the image encoding apparatus and image decoding apparatus of the first embodiment will be described below with reference to associated drawings.

Figure 3:
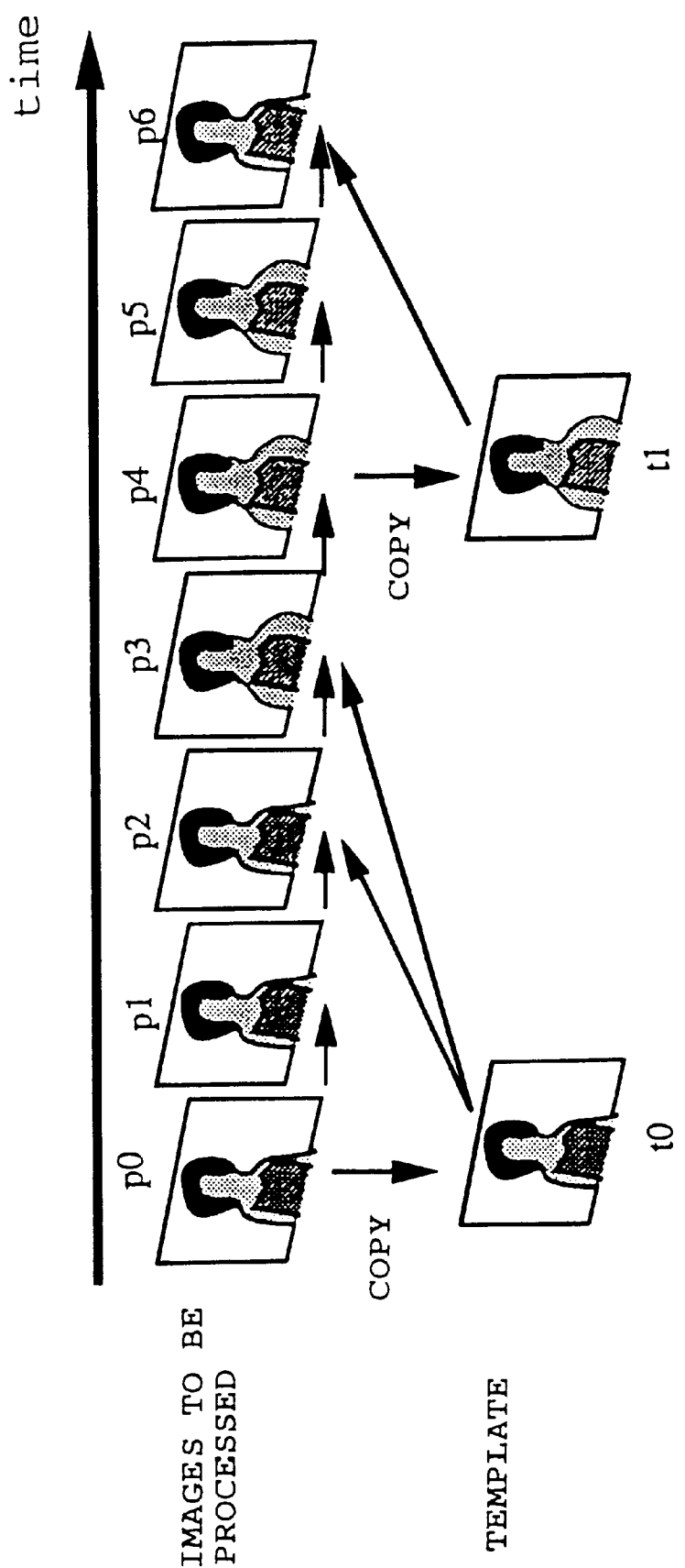
FIG. 3 is a schematic diagram showing a correspondence between images to be processed and templates according to the first embodiment.

First, relations between ordinary frames and representative frames (templates) will be described. FIG. 3 shows the relations between the ordinary frames and representative frames. In FIG. 3, p0 to p6 indicate the ordinary frames, and t0 and t1 the templates. The template t0 is created by copying from the ordinary frame p0, and the ordinary frames p2 and p3 are created by referring to the template t0. Likewise, the template t1 is created by copying from the ordinary frame p4, and the ordinary frame p6 is created by referring to the template t1. The ordinary frame is stored in the frame delay memory 23, while the template is stored in the template storing memory 24 when updating the template.

Suppose here that a previous frame is already stored as a reference image in the frame delay memory 23 and a template as a reference image in the template storing memory 24. When an input image arrives, the motion estimator 21a detects a motion vector for each macroblock of 16×16 pixels from the input image and the reference image stored in the frame delay memory 23, and outputs the result of the detection to the weighted motion compensator 22a, correlation comparator 26, and multiplexed motion vector encoder 28. Likewise, the motion estimator 21b detects a motion vector for each macroblock from the input image and the reference image stored in the template storing memory 24, and outputs the result of the detection to the weighted motion compensator 22b, correlation comparator 26, and multiplexed motion vector encoder 28.

Figure 5:
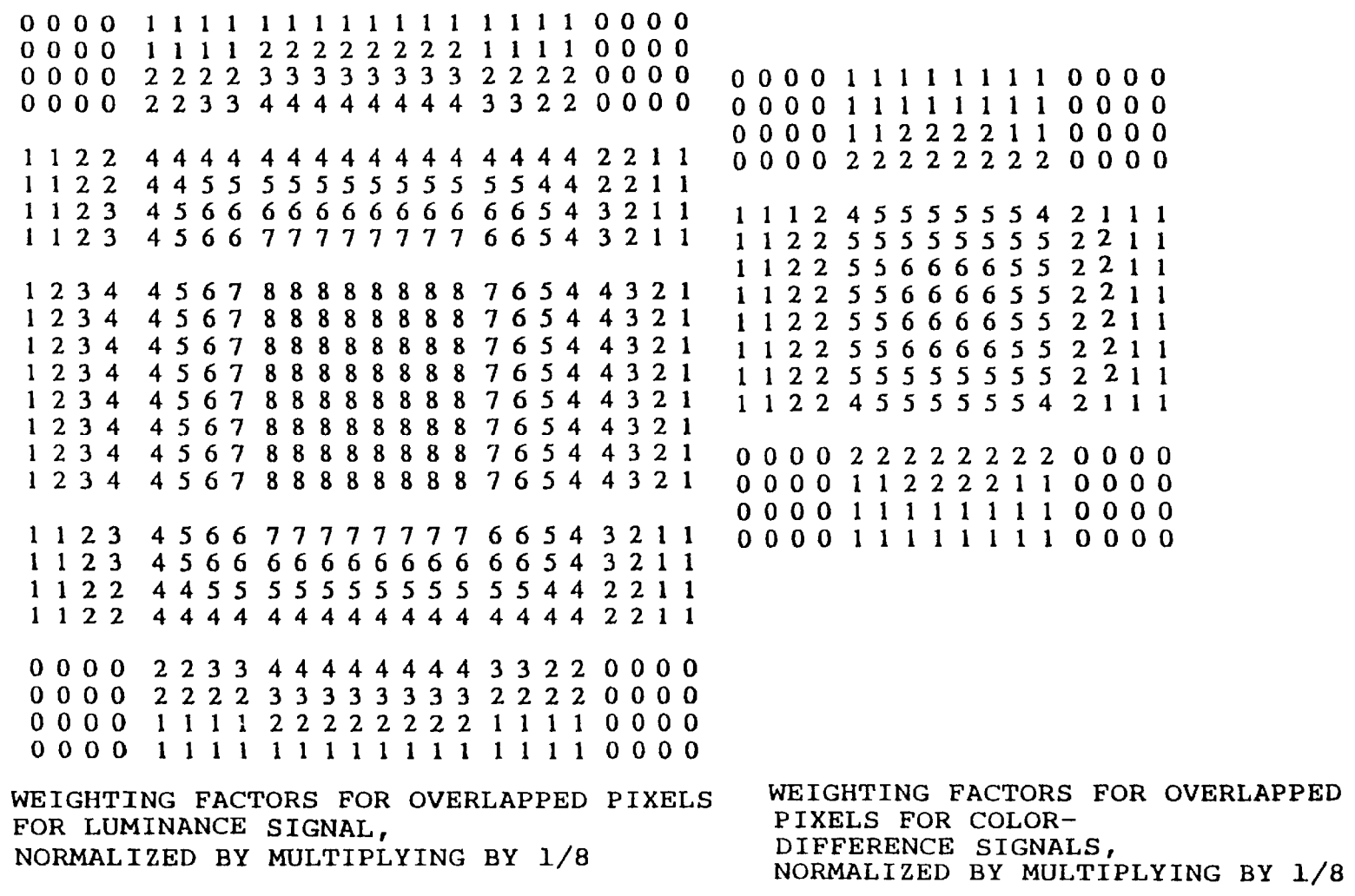

Next, based on the detected motion vector, the weighted motion compensator 22a searches the reference image for each target macroblock for a region having the highest correlation, and extracts a region of 24×24 pixels which is wider than the macroblock and contains the located region and its adjacent areas; then, the pixels in the extracted region are multiplied by weighting factors, such as shown in FIG. 5, to obtain pixels for the extracted region. In like manner, the weighted motion compensator 22b obtains pixels for a 24×24-pixel region by using the template as a reference image. Here, the weighting factors in the left side of FIG. 5 are for the luminance signal, and the weighting factors in the right side are for the color-difference signals.

Figure 4:
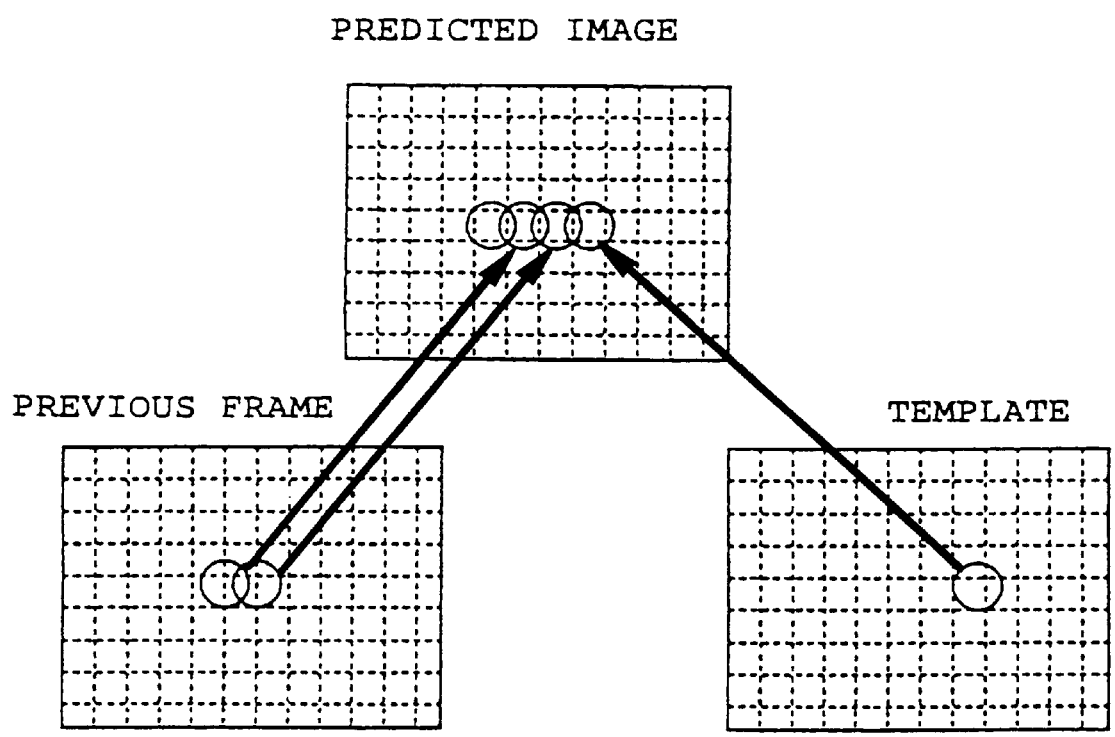
FIG. 4 is a schematic diagram for explaining the relationship between a predicted image and a reference image according to the first embodiment.

On the other hand, the correlation comparator 26 compares the outputs of the motion estimators 21a and 21b, and judges which reference image has the higher correlation with the input image, based on the result of which the reference image selection switch 27 is switched to select the output of the associated weighted motion compensator for connection to the predicted-image memory 25. At this time, the result of the comparison is also output to the multiplexed motion vector encoder 28 as a selection control bit. Suppose here that the weighted motion compensator 22a has been selected as the result of the judgement. Then, as shown in FIG. 4, pixels for the weighted wider region (indicated by a circle in the figure, with the macroblock indicated by a square region enclosed by dotted lines) are input to the predicted-image memory 25 from the previous frame stored in the frame delay memory 23. After that, if it is judged by the correlation comparator 26 that there is high correlation between the input image and the template, then the weighted motion compensator 22b is selected, and pixels for the associated weighted region are input from the template, as shown in FIG. 4. In this way, processing is performed on all macroblocks, and the overlapped pixels are normalized by dividing by 8, thus constructing a predicted image in the predicted-image memory 25. The normalization is performed by reading data from the predicted-image memory 25 by shifting the data 3 bits, so that special hardware is not required. In this way, since motion vectors around each target block need not be used in building a predicted image, a different reference image can be used for each different block, and even if the reference images are different between adjacent blocks, weighting can be applied to the pixels in the overlapped portions (each consisting of 4 pixels in the illustrated example) of the extracted regions.

This allows a predicted image to be built from the temporally adjacent previous frame for moving image portions where motion vectors are large, and from the high-resolution template for stationary image portions where motion vectors are small. In this way, the predicted image can be built by smoothly concatenating the block boundaries.

Typical usage of templates is as pre-stored background image for prediction. Suppose that reference images are the previous frame and the templates that memorizes the background, the background and the portions in the background that appear and disappear behind a moving object in the foreground, can be predicted smoothly.

When both previous and next frames are used as reference images, the resulting image can be used as a B-frame picture defined in MPEG 1/2.

(Embodiment 2)

Figure 6:
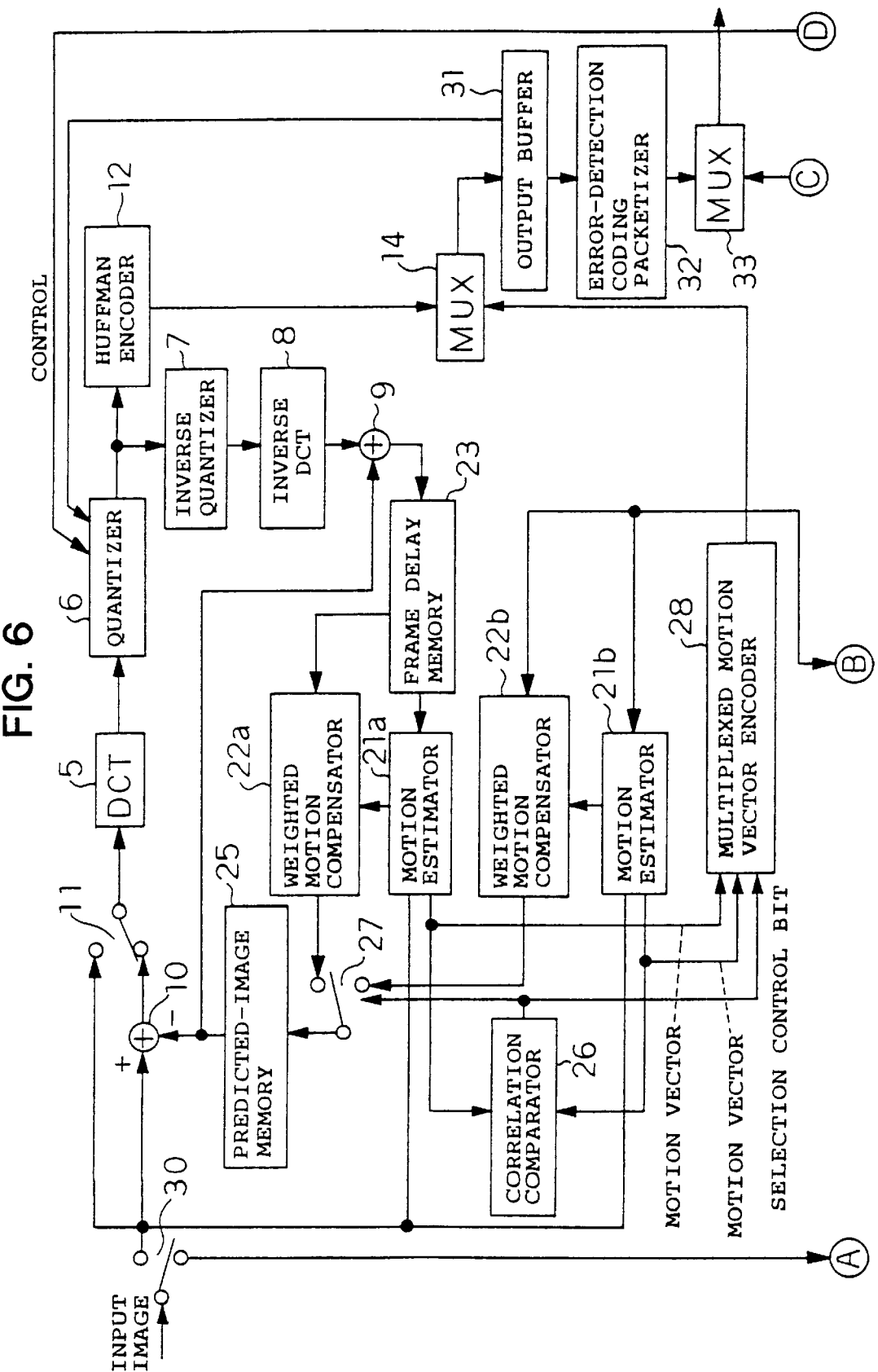
FIG. 6 is a block diagram showing the configuration of the first half of an image encoding apparatus according to a second embodiment of the present invention.
Figure 7:
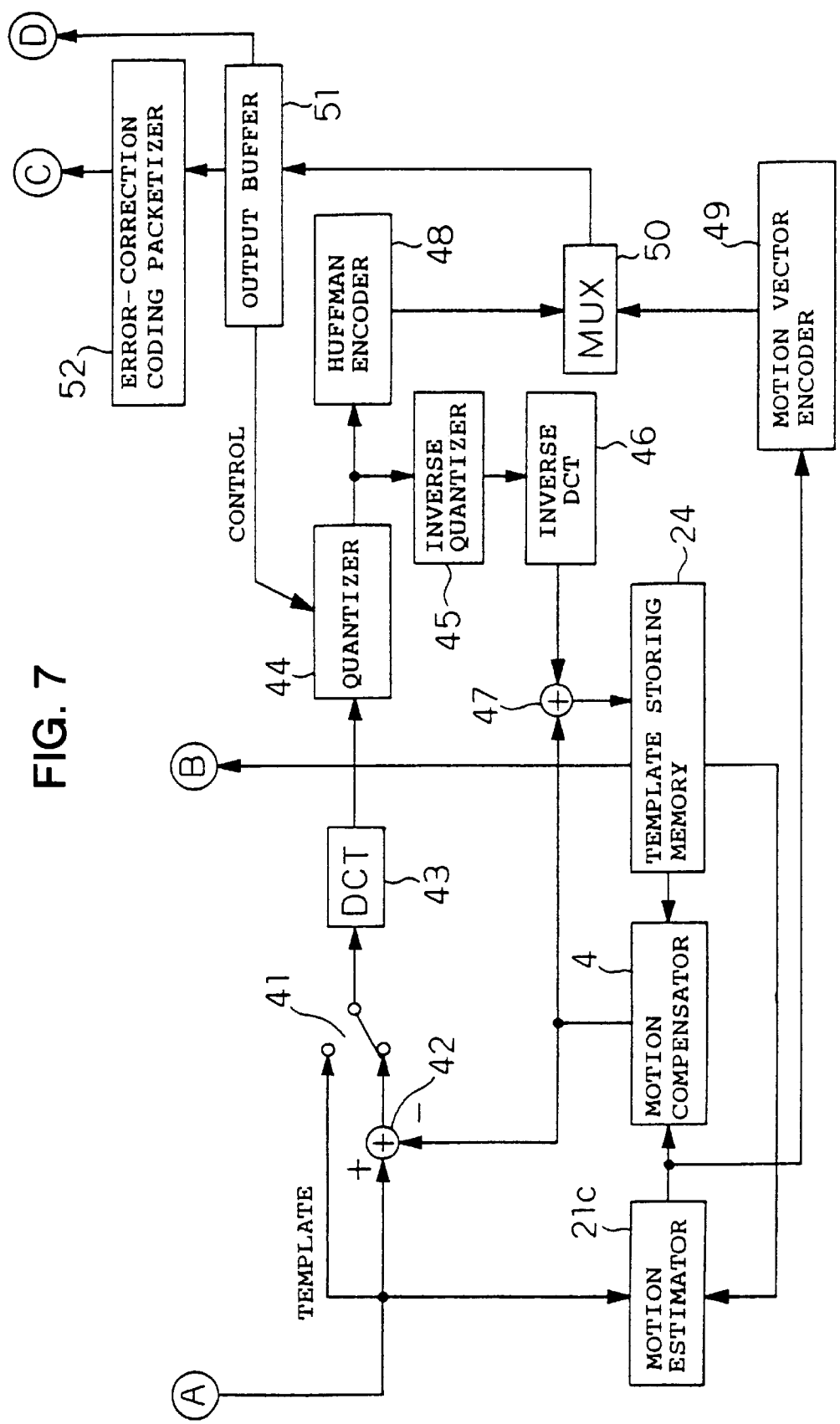
FIG. 7 is a block diagram showing the configuration of the second half of the image encoding apparatus connected to the first half thereof shown in FIG. 6.
Figure 8:
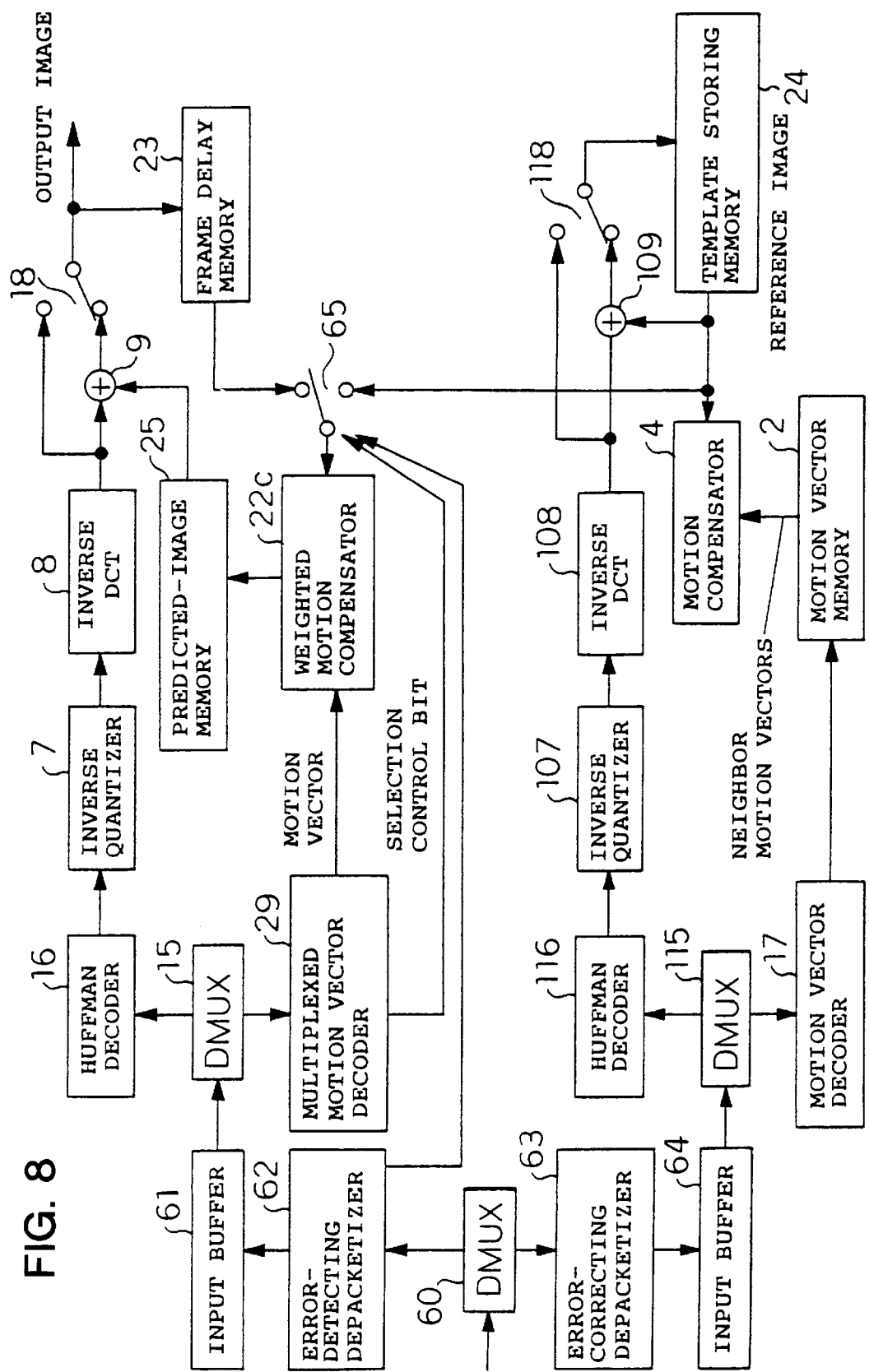
FIG. 8 is a block diagram showing the configuration of an image decoding apparatus corresponding to the image encoding apparatus of the second embodiment.

FIGS. 6 and 7 are block diagrams showing the configuration of an image encoding apparatus according to a second embodiment of the present invention, and FIG. 8 is a block diagram showing the configuration of an image decoding apparatus corresponding to the image encoding apparatus. Major differences in this embodiment from the foregoing first embodiment are that the ordinary frame and template are processed separately and the data are packetized and output as different bit streams, and that an error-detecting code is appended to the ordinary frame and an error-correcting code to the template.

In addition to the configuration of the image encoding apparatus of FIG. 1, the image encoding apparatus of FIG. 6 further includes: an input selection switch 30 which switches the input image depending on whether the input image is an ordinary frame or a template; an output buffer 31 for an ordinary frame; an error-detection coding packetizer 32 for packetizing ordinary frame data by appending an error-detecting code to it; and a MUX 33 for multiplexing ordinary frame packet data and template packet data together for output. On the other hand, the template updating switch 19 shown in FIG. 1 is omitted.

FIG. 7 shows a section for performing encoding operations when the input image is a template. This section comprises: an intraframe/interframe coding selection switch 41; a DCT 43 for discrete-cosine-transforming an image signal; a quantizer 44 for quantizing the discrete-cosine-transformed signal; a Huffman encoder 48 for variable-length encoding the quantized signal; a template storing memory 24 for storing a template as a reference image; a motion estimator 21c for detecting a motion vector based on the input image and the template stored in the template storing memory 24; a motion compensator 4 for creating a predicted image from the template by using the motion vector; a subtractor 42 for obtaining a residual between the predicted image and the input image; an inverse quantizer 45 for inverse-quantizing the output of the quantizer 44; an inverse DCT 46 for inverse-discrete-cosine-transforming the inverse-quantized signal; and an adder 47 for adding the inverse-discrete-cosine-transformed signal to the predicted image.

There are further provided: a motion vector encoder 49 for encoding the motion vector detected by the motion estimator 21c; a MUX 50 for multiplexing the encoded motion vector with the variable-length encoded signal; an output buffer 51 for a template; and an error-correction coding packetizer 52 for packetizing template data by appending an error-correcting code to it.

On the other hand, in the image decoding apparatus in FIG. 8, a DMUX 60 is provided that takes as an input the bit stream output from the image encoding apparatus and demultiplexes it into the ordinary frame packets and template packets. To process the ordinary frame packets, there are provided: an error-detecting depacketizer 62 for disassembling each ordinary frame packet; an input buffer 61 for an ordinary frame; and an image decoder having substantially the same configuration as that shown in FIG. 2.

To process the template packets, there are provided: an error-correcting depacketizer 63 for disassembling each template packet; an input buffer 64 for a template; a DMUX 115 for demultiplexing the signal from the input buffer 64 into the image signal and the motion vector; a Huffman decoder 116, an inverse quantizer 107, and an inverse DCT 108, for decoding the demultiplexed image signal; a template storing memory 24 for storing the template as a reference image; a motion vector decoder 17 for decoding the motion vector; a motion vector memory 2 for storing the decoded motion vector; a motion compensator 4 for creating a predicted image from the template stored in the template storing memory 24 by using the motion vector; an adder 109 for adding the thus created predicted image to the output of the inverse DCT 108; and an intraframe/interframe coding selection switch 118. Here, the template is decoded using the same method as practiced in the prior art.

There are further provided: a reference image selection switch 65 for switching the reference image between the ordinary frame in the frame delay memory 23 and the template on the basis of the selection control bit output from the multiplexed motion vector decoder 29; and an output image selection switch 66 for switching the output image from the ordinary frame to the template when an error is detected in the ordinary frame by the error-detecting depacketizer 62.

The operation of the image encoding apparatus and image decoding apparatus of the second embodiment will be described below with reference to associated drawings.

Figure 9:
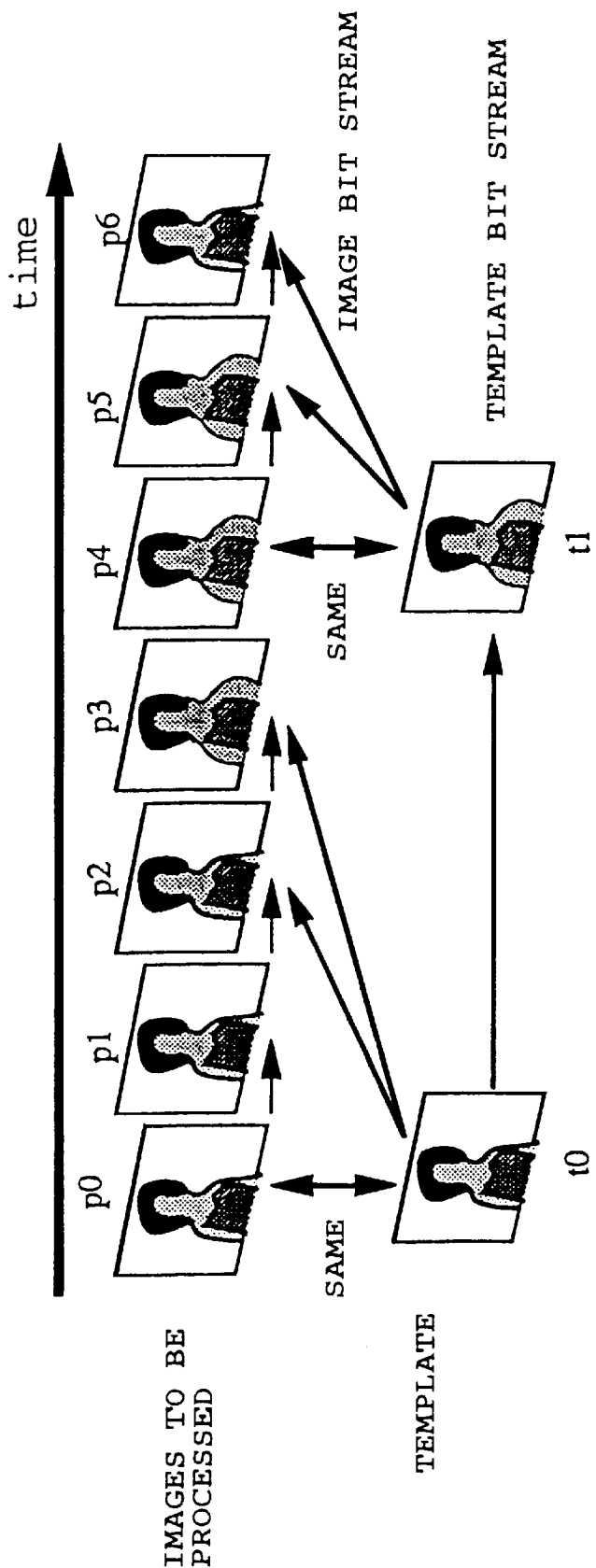
FIG. 9 is a schematic diagram showing a correspondence between images to be processed and templates according to the second embodiment.

First, in the present embodiment, as shown in FIG. 9, the ordinary frames, p0 to p6, and the templates, t0 and t1, which are the same as p0 and p4, are processed as different bit streams. The data are packetized; more specifically, as shown in the packet structure of FIG. 11, an identifier for identifying between an ordinary frame and a template is contained at the head of the packet, which is followed by a frame number indicating the sequence of playback. Next, in the case of a template, a Reed-Solomon error-correcting code is appended to the data, whereas in the case of an ordinary frame, the frame number of the template that the ordinary frame refers to and a CRC error-detecting code are appended. The error-correcting code is appended only for the template, and the error-detecting code is appended for the ordinary frame, because the data amount of the error-correcting code is larger than that of the error-detecting code.

Referring back to FIG. 6, when the input image is an ordinary frame, the input selection switch 30 is connected to the upper position, and the same encoding process as that described in the first embodiment is performed on the ordinary frame. At this time, the quantizer 6 is controlled by the signals from the output buffers 31 and 51. Each output buffer is a FIFO buffer, which is implemented as a ring buffer which circulates a write address and read address for a memory area. The buffer available amount is expressed as the difference between the write address and read address, and when the write address goes beyond the read address (this is not a simple comparison of address sizes because the addresses are circulating), the buffer overflows and part of transmitted image information is dropped. This can be avoided by varying the quantization step size according to the buffer available amount, which means that the quantizers 6 and 44 should be controlled according to the buffer available amounts of the output buffers 31 and 51. This processing is called rate control. The image data variable-length encoded by the Huffman encoder 12 and the motion vector and selection control bit multiplexed and encoded by the multiplexed motion vector encoder 28 are multiplexed together by the MUX 14 and then fed into the output buffer 31, from which the data is supplied to the error-detection coding packetizer 32 where the data is assembled into packets each containing a CRC error-detecting code as previously shown in FIG. 11.

On the other hand, when the input image is a template, the input selection switch 30 is connected to the lower position, and encoding is performed in the template encoding section shown in FIG. 7. The encoding section applies encoding operations similar to those performed in conventional image encoding apparatus of the prior art. That is, when the template is intraframe-coded, the intraframe/interframe coding selection switch 41 is connected to the upper position, and the encoding is performed by the DCT 43, quantizer 44, and Huffman encoder 48. When the template is interframe-coded, on the other hand, the intraframe/interframe coding selection switch 41 is connected to the lower position, and the motion estimator 21c detects a motion vector based on the input template and the reference image stored in the template storing memory 24; then, the motion compensator 4 creates a predicted image from the reference image using the detected motion vector, the residual between the predicted image and the input template is calculated by the subtractor 42, and the resulting residual signal is encoded by the DCT 43, quantizer 44, and Huffman encoder 48. The detected motion vector is encoded by a motion vector encoder 49.

Figure 11:
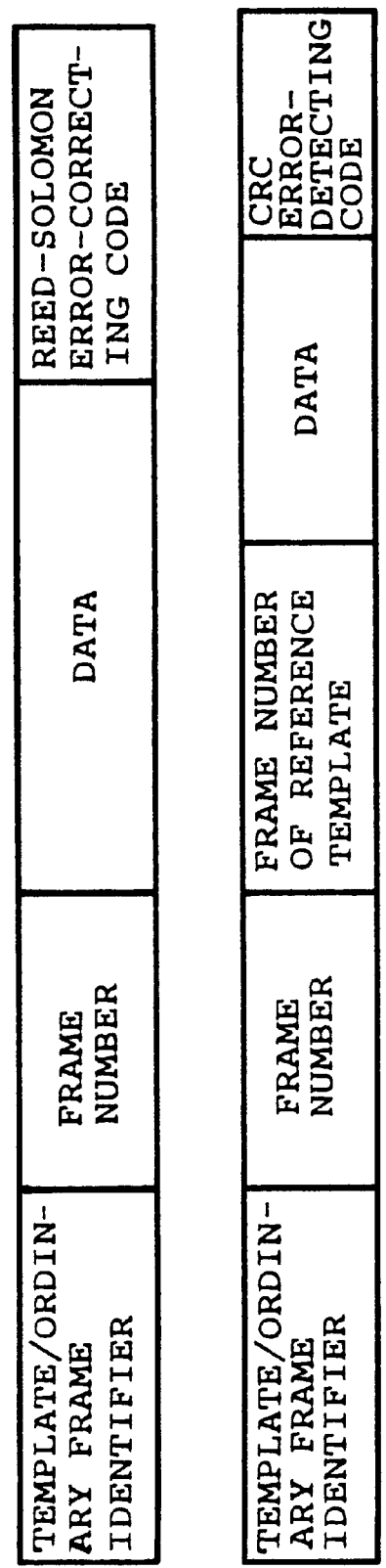
FIG. 11 is a diagram showing a packet structure according to the second embodiment.

Next, the template image data variable-length encoded by the Huffman encoder 48 and the motion vector encoded by the motion vector encoder 49 are multiplexed together by the MUX 50 and then fed into the output buffer 51, from which the data is supplied to the error-correction coding packetizer 52 where the data is assembled into packets each containing a Reed-Solomon error-correcting code as previously shown in FIG. 11.

The error-detection coded ordinary frame packets and the error-correction coded template packets, which have been formed as different bit streams as described above, are time-division multiplexed by the MUX 33 and output as a single bit stream.

Referring next to FIG. 8, the bit stream from the image encoding apparatus is input to the DMUX 60 for demultiplexing into the ordinary frame packets and template packets. The demultiplexing can be easily achieved using the identifier appended at the head of each packet. The demultiplexed ordinary frame packets are fed into the error-detecting depacketizer 62 where each packet is disassembled and the error-detection code is interpreted. After packet disassembly, the data is supplied to the input buffer 61, and the decoding process thereafter is identical to that described in the first embodiment. On the other hand, the template packets are fed into the error-correcting depacketizer 63 where each packet is disassembled and the error-correcting code is interpreted. After packet disassembly, the data is supplied to the input buffer 64. After that, the data is demultiplexed by the DMUX 115 into the image signal and motion vector; then, the image signal is decoded by the Huffman decoder 116, inverse quantizer 107, inverse DCT 108, and adder 109, while the motion vector is supplied to the motion compensator 4 through the motion vector memory 2, to build a predicted image from the reference image stored in the template storing memory 24.

Figure 10:
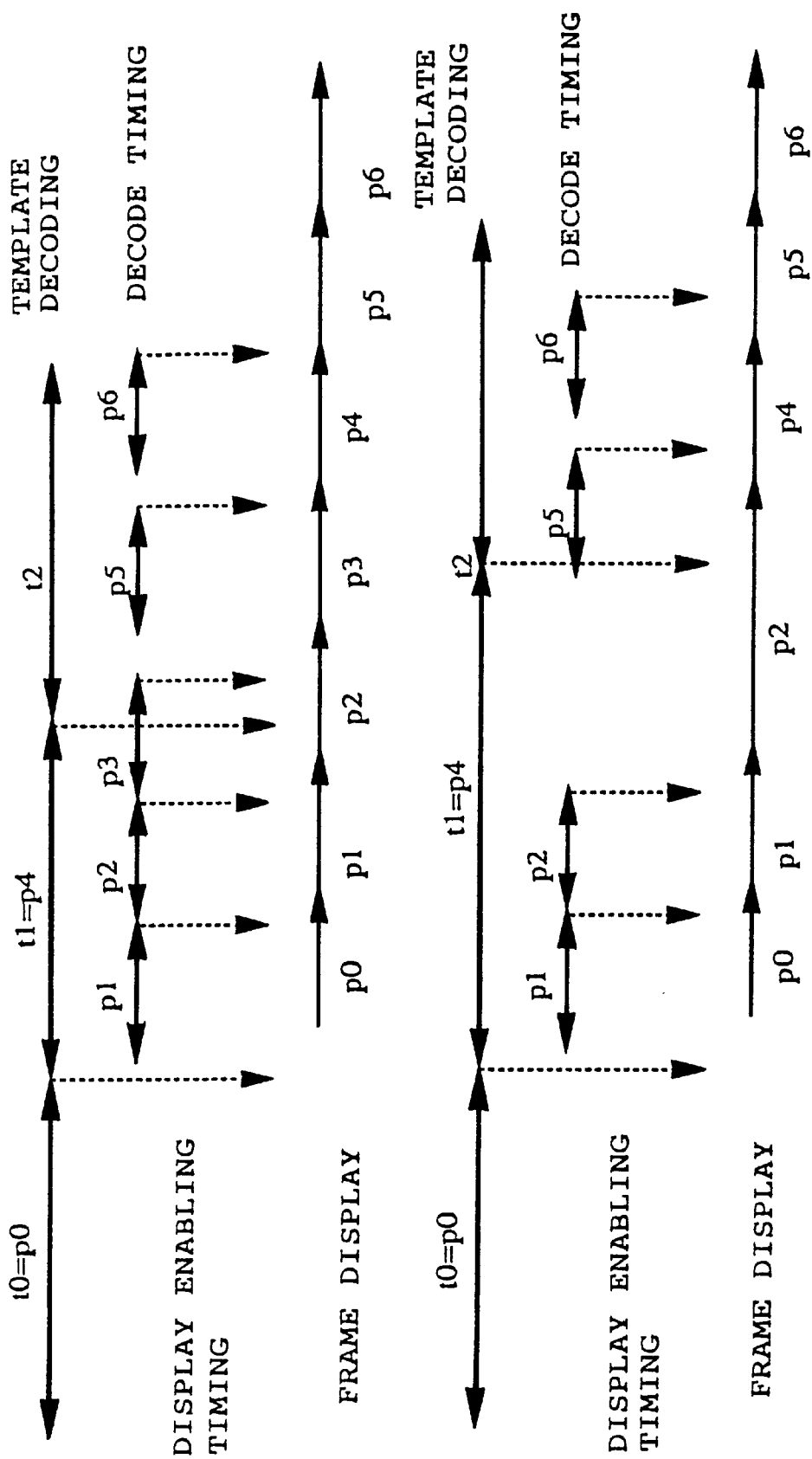
FIG. 10 is a diagram for explaining decoding timing of a multiplexed bit stream in the image decoding apparatus of the second embodiment.

In the decoding process, decoding of templates is given priority. For example, in cases where a template is encoded for every four frames as shown in FIG. 10, the decoding of the template t1 is performed before the decoding of the ordinary frames p2, p3, etc. that use the template t0 as a reference (see the upper part of the figure). At this time, if it takes time to decode the template t1 and the display of the ordinary frame p3, if decoded, is not likely to be in time, as shown in the lower part of the figure, then the decoding of p3 is stopped halfway. In this way, the decoding of t1 can be completed before the display timing of the ordinary frame p4 arrives.

Further, in the present embodiment, if an error such as a transmission error is detected in an ordinary frame by the error-detecting depacketizer 62, the data of the ordinary frame is discarded. More specifically, the error-detecting depacketizer 62 in FIG. 8 outputs a control signal to the output image selection switch 66 so that the output image is switched to the template. On the other hand, if there occurs an error such as a transmission error in a template, the error in the data is corrected by the error-correcting code appended to the packet. When an ordinary frame is discarded because of an error, the template is forcibly output as a substitute frame for the ordinary frame. In this way, if errors occur along transmission channels, etc., a minimum required level of image quality can be maintained using templates, thus providing resistance to channel and other errors.

In the above embodiment, a Reed-Solomon error-correcting code is used as the error-correcting code, and a CRC error-detecting code as the error-detecting code, but it will be appreciated that they are not limited to these specific codes but other error-correcting and error-detecting codes can be used.

(Embodiment 3)

Figure 12:
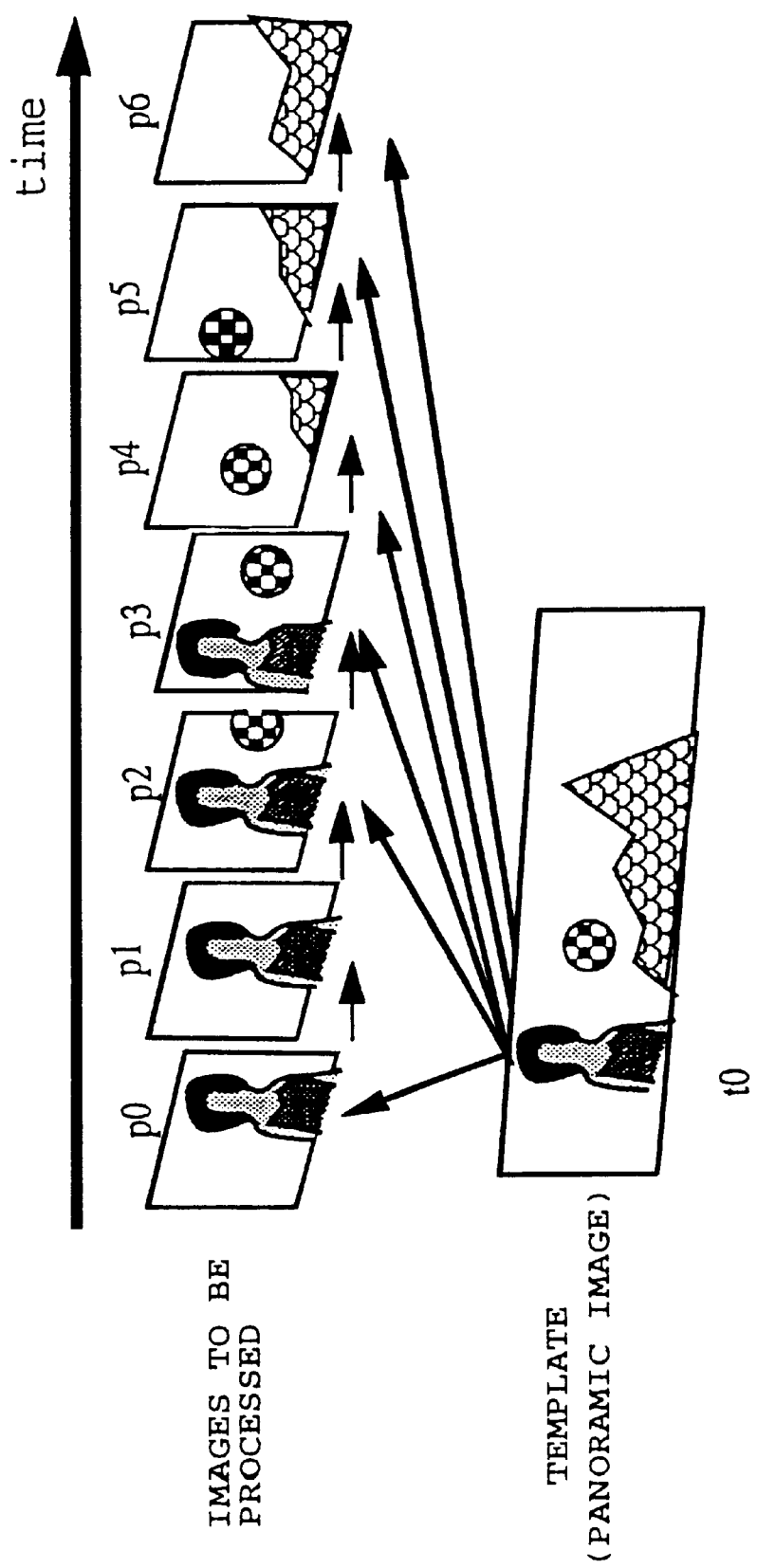
FIG. 12 is a schematic diagram showing a correspondence between images to be processed and a template according to a third embodiment of the present invention.
Figure 13:
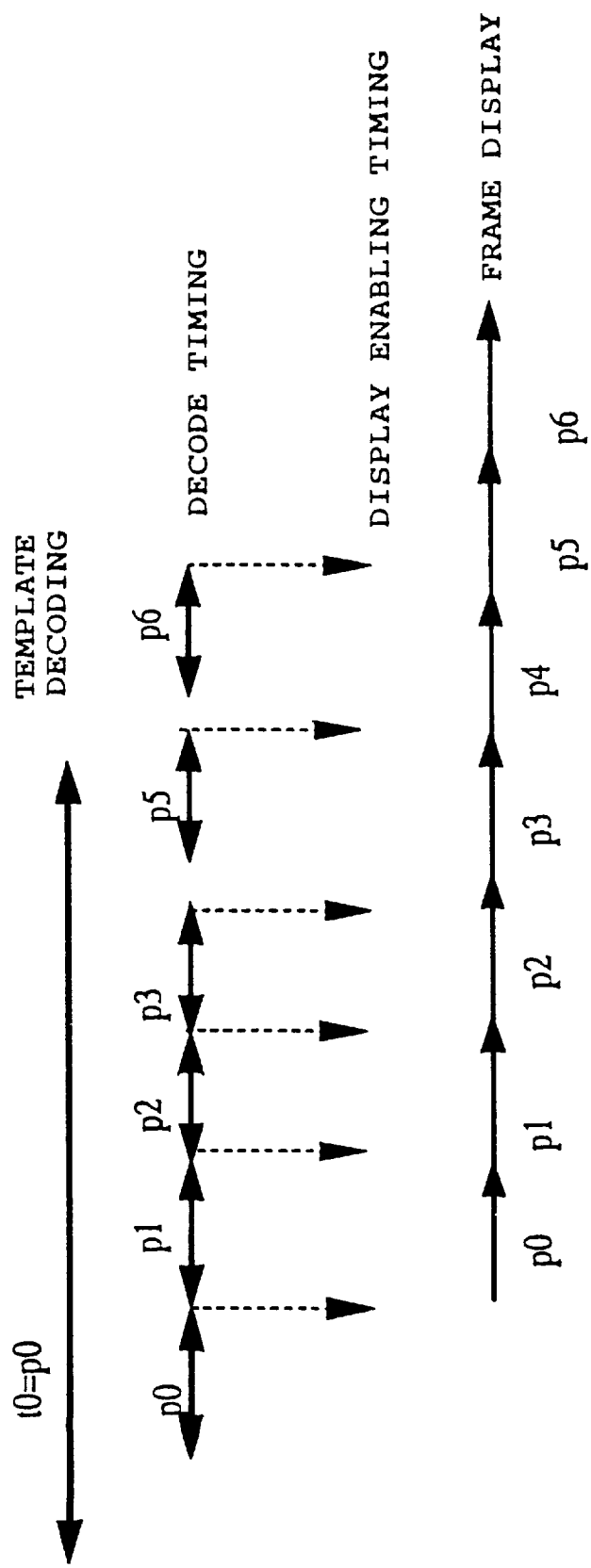
FIG. 13 is a diagram for explaining decoding timing in an image decoding apparatus according to the third embodiment.

FIG. 12 is a schematic diagram showing relations between images to be processed and a template according to a third embodiment of the present invention. This embodiment is an extension of the foregoing second embodiment, and is intended for application where the template is a panoramic image or the like larger than an ordinary frame, for example, when ordinary frames p0 to p6 use a single template t0 as a reference, as shown in FIG. 12, or where reference blocks can be specified in advance in the reference image. FIG. 13 is a diagram showing processing timing for the images shown in FIG. 12; in the process shown, during the decoding of the template t0 the ordinary frames are sequentially decoded, starting with p0, for presentation for display.

Figure 14:
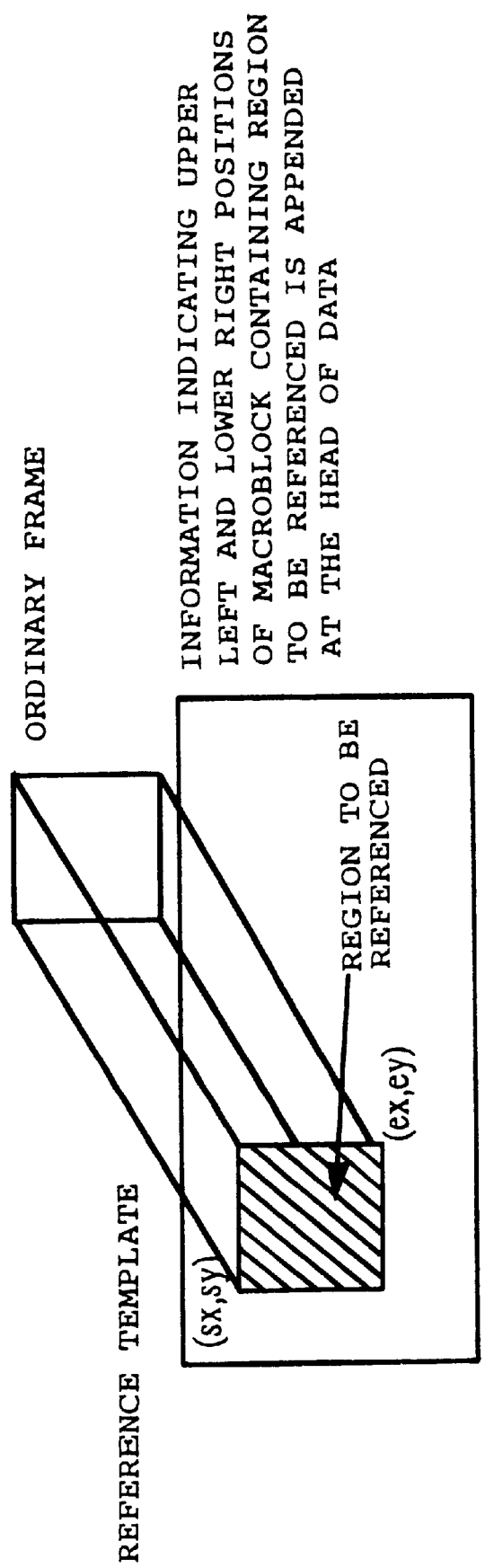
FIG. 14 is a diagram for explaining a reference region according to the third embodiment.

To implement this, information indicating the upper left position and lower right position of a macroblock containing a template sub-region to be referenced (see FIG. 14) is appended, for example, at the head of each ordinary frame packet. Likewise, information indicating the upper left position and lower right position of the macroblock that a transmitted sub-image occupies in the entire image is appended to each template packet so that the sub-image necessary for the decoding of the template can be decoded in advance. How the template image is divided into sub-images is at the discretion of the encoding end. Assuming that the encoding and decoding of the template are performed on each divided sub-image independently, and that the numbers of macroblocks in both horizontal and vertical directions of the entire image are known, the decoding sequence of the template can be uniquely reconstructed from the frame number and the information indicating the upper left and lower right positions of each associated macroblock. Whether the reference regions in the template are constructed with correct timing is also dependent on the bit stream construction at the encoding end; on the other hand, at the decoding end, whether an ordinary frame can be played back or not can be determined based on the header data of the ordinary frame packet using the frame number of the reference template and the range of the reference macroblock carried in the packet.

(Embodiment 4)

Figure 15:
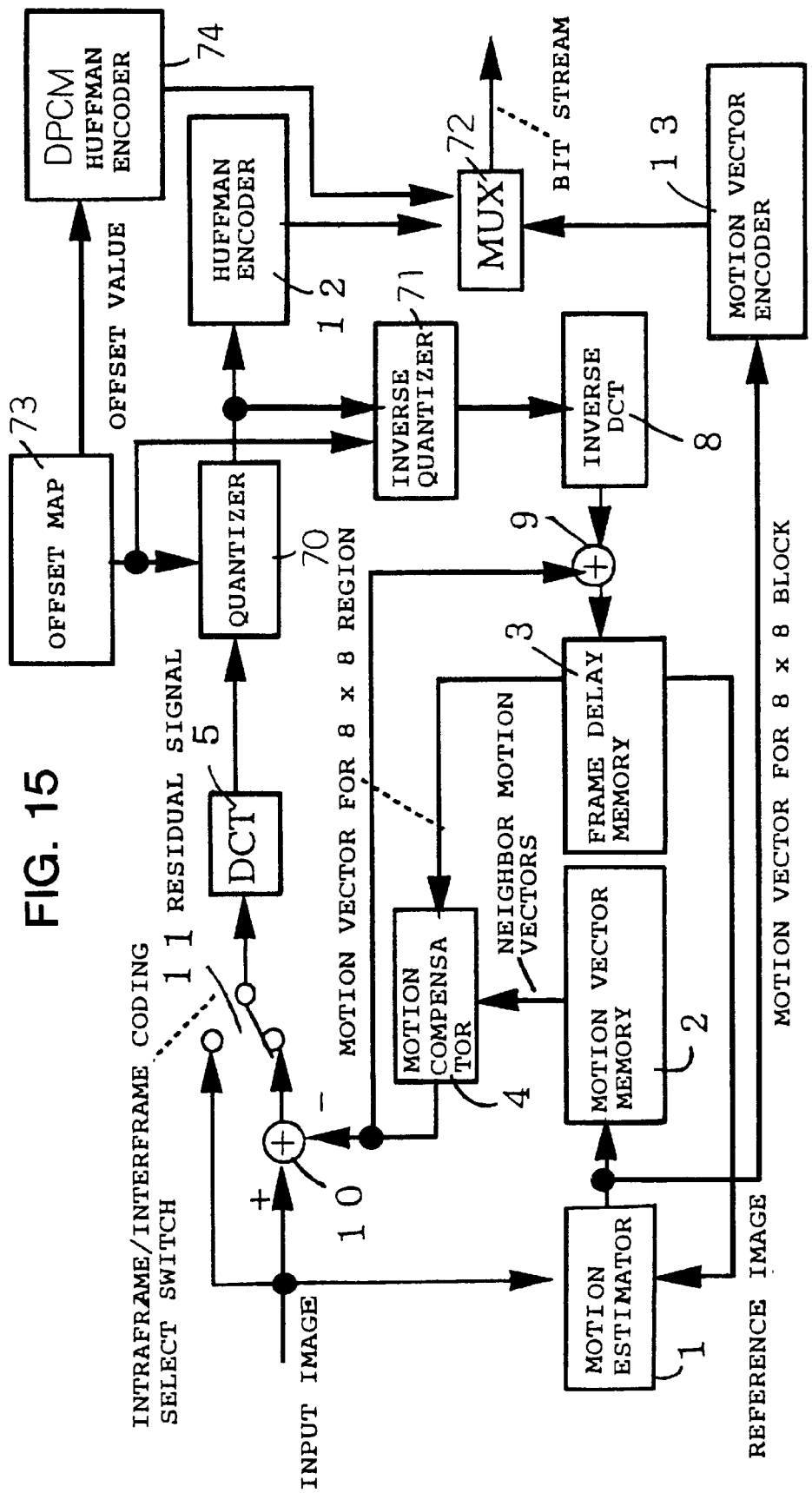
FIG. 15 is a block diagram showing the configuration of an image encoding apparatus according to a fourth embodiment of the present invention.
Figure 16:
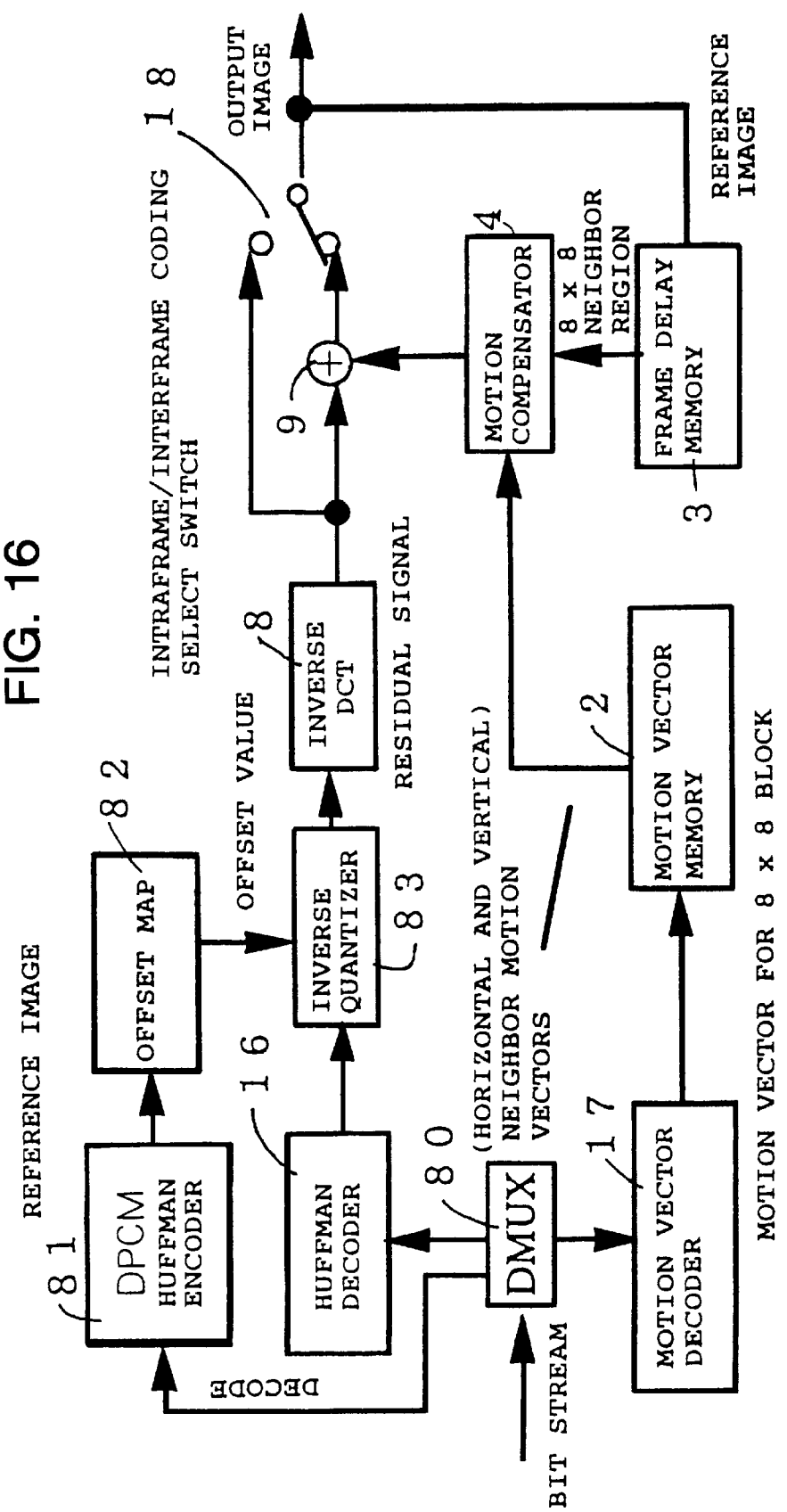
FIG. 16 is a block diagram showing the configuration of an image decoding apparatus corresponding to the image encoding apparatus of FIG. 15.
Figure 17:
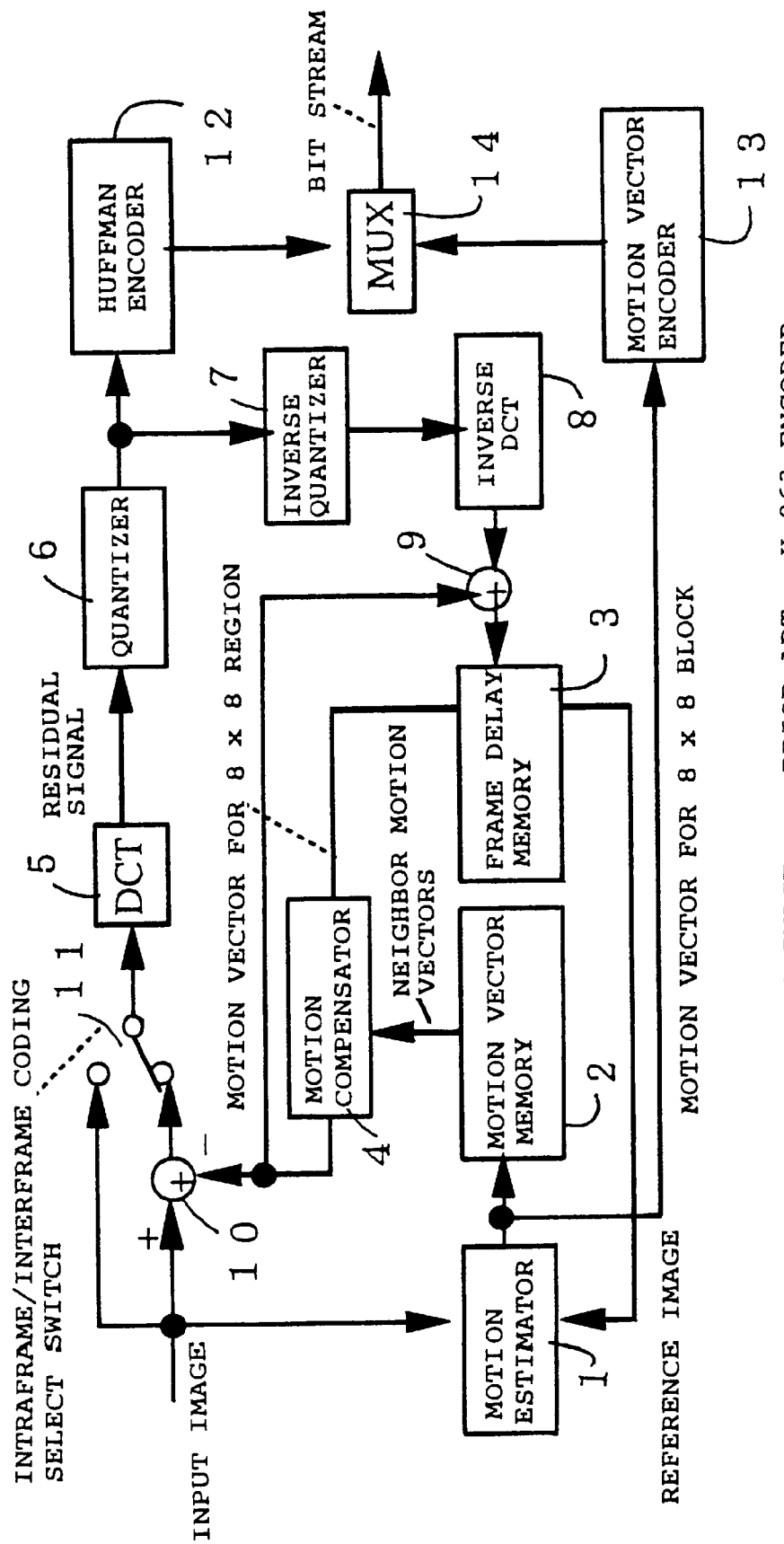
FIG. 17 is a block diagram showing the configuration of an image encoding apparatus according to the prior art.
Figure 18:
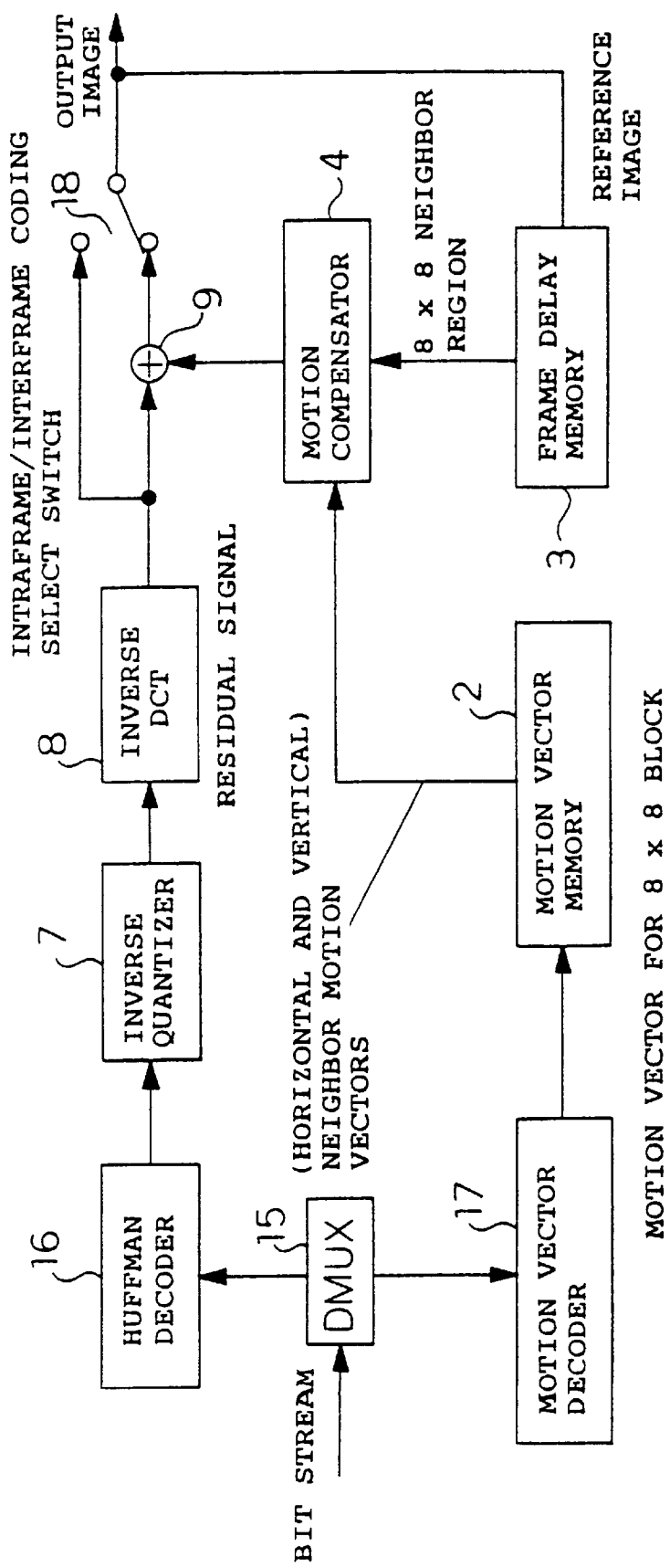
FIG. 18 is a block diagram showing the configuration of an image decoding apparatus corresponding to the image encoding apparatus of FIG. 17.
Figure 19A:
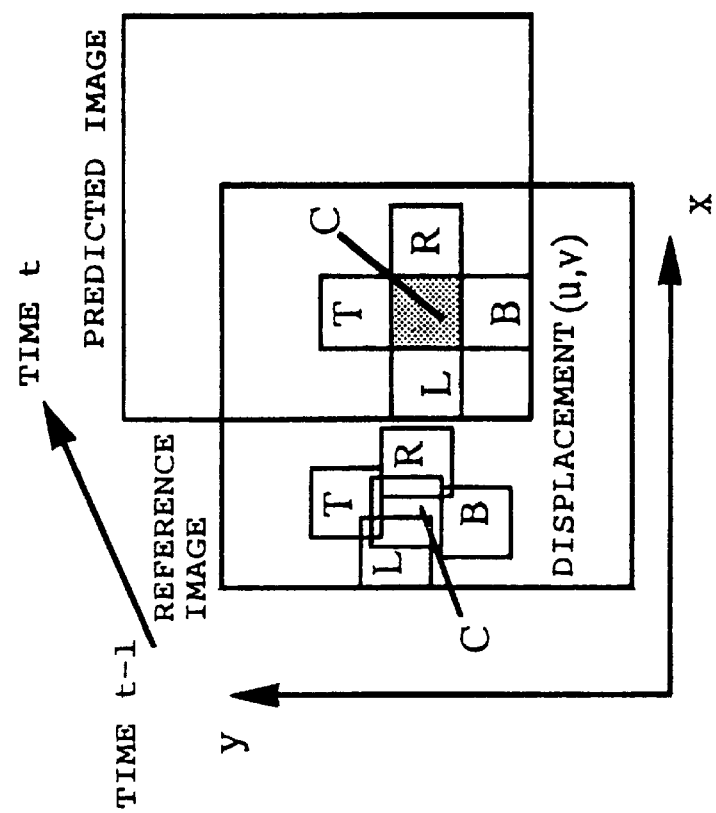
FIG. 19(a) is a diagram for explaining how a motion vector is obtained in the prior art image encoding apparatus.
Figure 19B:
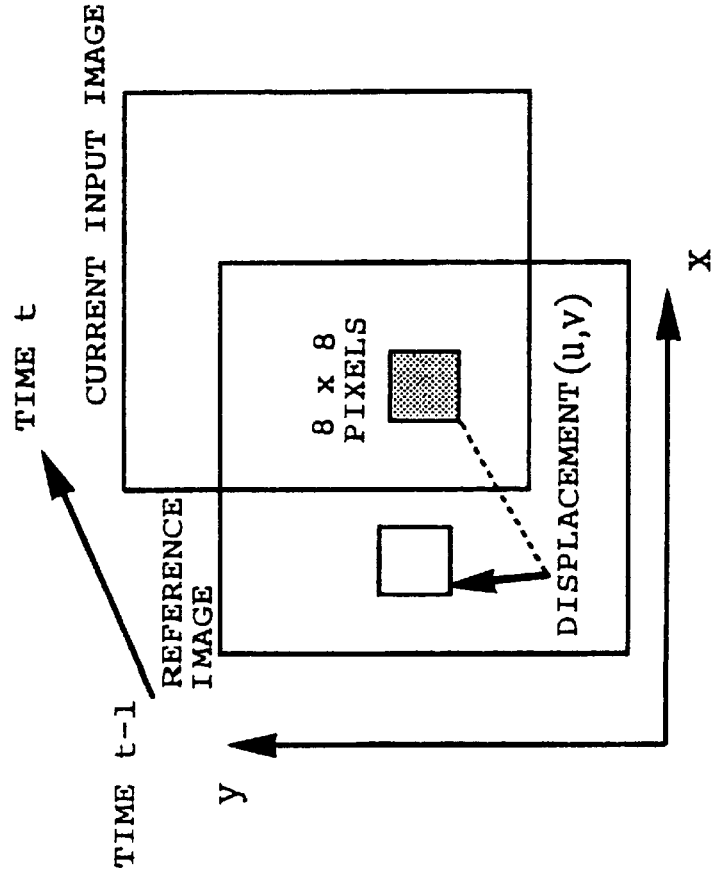
FIG. 19(b) is a diagram for explaining how a predicted image is obtained.
Figure 20:
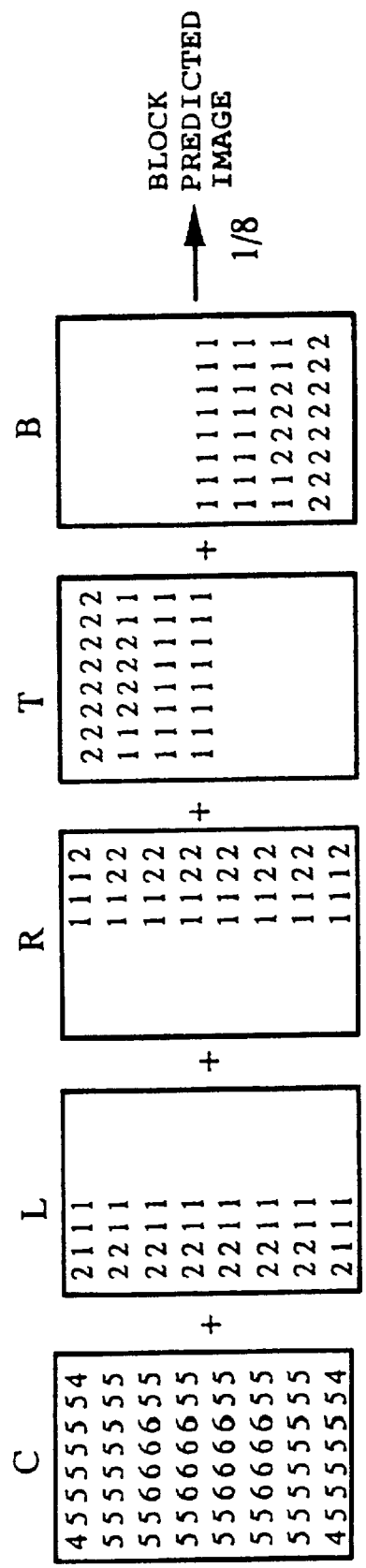
FIG. 20 is a diagram for explaining how a predicted image is obtained in the prior art image encoding apparatus.

FIG. 15 is a block diagram showing the configuration of an image encoding apparatus according to a fourth embodiment of the present invention. Further, FIG. 16 is a block diagram showing the configuration of an image decoding apparatus corresponding to the image encoding apparatus.

The image encoding apparatus of the present embodiment is identical in configuration to the image encoding apparatus of the prior art, except for the addition of:

an offset map 73 in which offset values for varying the quantization step size from block to block are arranged in corresponding relationship to each image; and a DPCM Huffman encoder 74 for variable-length encoding the data of the offset map 73.

Here, for the DPCM Huffman encoder 74, variable-length codes of both direction components of motion vectors in H.261 can be used. The quantizer 70 and the inverse quantizer 71 apply quantization and inverse quantization, respectively, according to the offset map 73, and the MUX 72 multiplexes output signals from the Huffman encoder 12, DPCM Huffman encoder 74, and motion vector encoder 13 and produces a bit stream for output.

On the other hand, in the image decoding apparatus of the present embodiment, the DMUX 80 takes as an input the bit stream output from the image encoding apparatus and demultiplexes it into the image data, motion vector, and offset map data. The configuration is identical to that of the previously described image decoding apparatus of the prior art, except for the addition of a DPCM Huffman decoder 81 for decoding the offset map data demultiplexed by the DMUX 80, and an offset map 82 for storing the offset map values output. The inverse quantizer 83 applies inverse quantization by changing the quantization step size according to the offset map 82.

For example, for applications such as videophones where a coarse image is sufficient for the background area that contains little motion in the image and is not important, but it is desired to transmit a fine image for the center area that requires fine motion to convey expression changes, etc. of a person's face, quantization must be made finer for the center area of the image. This is achieved by adding an offset value of −2 to −3 for the center area and an offset value of +2 to +3 for the background area, to the normal quantization step size. The quantization step size is transmitted for each macroblock, and the offset map data is transmitted for each image. This offset is implemented as a modification of H.263 in the following manner.

One-bit control information called LQOM (Load Quantization step Offset Map) is added after the picture header PQUANT. Using this control information, the offset map is loaded by setting LQOM=1 for an I-picture, for example, and for P- and B-pictures, LQOM=0 and the previous offset map is used. Here, default offset values are all 0s (no offset).

In the embodiments thus far described, the prescribed block size of 16×16 has been used, and the prescribed size wider than the block size has been set to 24×24, but they need not be limited to these specific sizes. As previously described, other block sizes can be used, and for the wider prescribed size, any other size can be used as long as the size is larger than the block size.

Further, in the above embodiments, the motion estimators, etc. have been implemented using dedicated hardware, but instead, equivalent functions may be implemented in software using a computer, if possible.

As is apparent from the above description, the present invention provides the advantage that the reference image is not limited to any specific frame and the effects of overlap motion compensation having extensibility can be obtained.

Another advantage of the present invention is that, in decoding of an image that requires a non-fixed (variable) processing time of CPU or DSP, corruption of image playback can be avoided that could result when the interpretation of a bit stream was not done in time.

The present invention has the further advantage that error-resistant, low-delay image transmissions can be achieved by encoding a representative frame as a different bit stream.

What is claimed is:

1. An image encoding apparatus wherein input image data is divided into a representative frame representative of said image data and a second frame other than said representative frame, the representative frame being stored in a first memory and the second frame being stored in a second memory comprising said representative frame including a panoramic image larger than said second frame, a first encoder for obtaining a first residual frame between said representative frame stored in said first memory and said input image data, a second encoder for obtaining a second residual frame between said second frame stored in said second memory and said input image data, frame identifying information for identifying the representative frame and the second frame, respectively, appended to said first residual frame and said second residual frame, block identifying information for identifying a block in said representative frame, appended to said second residual frame, and bit streams of said first residual frame, said second residual frame, said frame identifying information and said block identifying information multiplexed together for transmission.

2. An image encoding apparatus comprising:

an offset map in which at least two offset values for a quantization step size are concurrently set for at least two areas of an image, the two areas of the image requiring quantization at different levels of precision, said offset values being used to change the quantization step size for each block when quantizing the two areas of the image to effect the different levels of precision for quantizing the two areas of the image for transmission in said image encoding apparatus; and offset appending means for appending data of said offset map at the head of data of said image.

3. An image decoding apparatus comprising:

offset extraction means for extracting said offset map from encoded data input from said image encoding apparatus of claim 2; and decoding means for changing the quantization step in each image based on the extracted offset value, and for inverse-quantizing said input encoded data with said changed quantization step size and thereby decoding said encoded data.

4. An image encoding method comprising the steps of:
(a) dividing input image data into a representative frame and a second frame, the representative frame including a panoramic image larger than the second frame,
(b) concurrently storing the representative frame in a first memory and the second frame in a second memory,
(c) obtaining a first residual frame between the input image data and the representative frame,
(d) obtaining a second residual frame between the input image data and the second frame,
(e) encoding the first residual frame and the second residual frame with separate encoders,
(f) appending data including a first identifier to the first residual frame, and
(g) appending data including a second identifier to the second residual frame,
(h) appending data to the second residual frame for indicating a block in the representative frame to be referenced by the second residual frame,
(i) combining the encoded first residual frame, the encoded second residual frame and the appended data in a multiplexer and
(j) transmitting the combined frames and the appended data.

* * * * *